US012732930B2

(12) United States Patent
Huang et al.

(10) Patent No.: US 12,732,930 B2
(45) Date of Patent: Sep. 8, 2026

(54) SYSTEMS AND METHODS FOR TIMING MISMATCH CALIBRATION IN DISTRIBUTED MIMO USING MULTIPLE SUB-BAND MEASUREMENTS

(71) Applicant: Samsung Electronics Company, Ltd., Suwon-si (KR)

(72) Inventors: Rui Huang, Vancouver (CA); Thuy Nguyen, Dallas, TX (US); Yang Li, Plano, TX (US); Nadisanka Rupasinghe, Allen, TX (US)

(73) Assignee: SAMSUNG ELECTRONICS COMPANY, LTD., Suwon City (KR)

( * ) Notice: Subject to any disclaimer, the term of this patent is extended or adjusted under 35 U.S.C. 154(b) by 330 days.

(21) Appl. No.: 18/405,751

(22) Filed: Jan. 5, 2024

(65) Prior Publication Data

US 2025/0227630 A1 Jul. 10, 2025

(51) Int. Cl.

*H04W 56/00* (2009.01)
*H04B 7/024* (2017.01)
*H04W 72/04* (2023.01)

(52) U.S. Cl.

CPC .......... *H04W 56/001* (2013.01); *H04B 7/024* (2013.01); *H04W 56/0035* (2013.01); *H04W 72/04* (2013.01)

(58) Field of Classification Search

CPC ........... H04W 56/001; H04W 56/0035; H04W 72/04; H04B 7/024; H04B 17/25;

(Continued)

(56) References Cited

U.S. PATENT DOCUMENTS

2019/0149247 A1 5/2019 Ananth
2020/0348975 A1 11/2020 Gupta (Continued)

OTHER PUBLICATIONS

International search report and Written Opinion received for PCT Application No. PCT/KR2024/012927, 6 pages, Dec. 2, 2024.

(Continued)

*Primary Examiner* — Noel R Beharry
*Assistant Examiner* — Angelie T Ngo
(74) *Attorney, Agent, or Firm* — Baker Botts L.L.P.

(57) ABSTRACT

In one embodiment, a method includes determining an optimal number of resource block separation between pairs of measurements based on system settings of a distributed communication system, wherein the system settings specify one or more of a maximum tolerable calibration error or a required calibration accuracy, accessing transmission signals comprising at least a first transmission signal and a second transmission signal, accessing measurements using reference signals at multiple sub-frequency bands over a particular frequency band, wherein the measurements comprise at least a first pair of measurements and a second pair of measurements, wherein the first and second pairs of measurements are separated by the optimal number of resource block separation, determining a timing mismatch between the first and second transmission signals based on the optimal number of resource block separation, and generating an integrated transmission signal based on the first and second transmission signals and the timing mismatch.

20 Claims, 9 Drawing Sheets

(58) Field of Classification Search
CPC ...... H04B 17/12; H04B 17/11; H04B 17/253; H04L 5/0051
See application file for complete search history.

(56) References Cited

U.S. PATENT DOCUMENTS

| | | | | |
|---|---|---|---|---|
| 2020/0396706 | A1 | 12/2020 | Sandgren | |
| 2022/0078738 | A1 * | 3/2022 | Zhang | H04B 7/0696 |
| 2023/0189182 | A1 | 6/2023 | Ballantyne | |
| 2023/0336310 | A1 * | 10/2023 | Alawieh | G01S 5/0268 |
| 2025/0048157 | A1 * | 2/2025 | Manolakos | H04W 72/0457 |

OTHER PUBLICATIONS

3GPP; TSG RAN; Measurements of radio performances for UMTS terminals in speech mode (Release 17)', 3GPP TR 25.914 V17.0.0, Apr. 4, 2022, pp. 36-38.
U.S. Appl. No. 62/522,059, filed Jun. 20, 2023, Nguyen.
U.S. Appl. No. 63/426,996, filed Nov. 21, 2022, Rupasinghe.
3GPP, TS 36.211 v16.4.0, "E-UTRA, Physical channels and modulation." https://portal.3gpp.org/desktopmodules/Specifications/SpecificationDetails.aspx?sp ecificationId=2425, Version 16.4.0, Dec. 2020, 249 pages.
3GPP, TS 36.212 v16.4.0, "E-UTRA, Multiplexing and Channel coding." https://portal.3gpp.org/desktopmodules/Specifications/SpecificationDetails.aspx?specificationId=2426, Version 16.4.0, Dec. 2020, 254 pages.
3Gpp, TS 36.213 v16.4.0, "E-UTRA, Physical Layer Procedures." https://portal.3gpp.org/desktopmodules/Specifications/SpecificationDetails.aspx?specificationId=2427, Version 16.0.0; Dec. 2019, 568 pages.
3GPP, TS 36.321 v16.3.0, "E-UTRA, Medium Access Control (MAC) protocol specification." https://portal.3gpp.org/desktopmodules/Specifications/SpecificationDetails.aspx?specificationId=2437, Version 16.3.0, Dec. 2020, 142 pages.
3GPP TS 36.331 v16.3.0, "E-UTRA, Radio Resource Control (RRC) Protocol Specification." https://portal.3gpp.org/desktopmodules/Specifications/SpecificationDetails.aspx?specificationId=2440, Version 16.3.0, Dec. 2020, 1084 pages.
3GPP, TS 38.211 v16.4.0, "NR, Physical channels and modulation." https://portal.3gpp.org/desktopmodules/Specifications/SpecificationDetails.aspx?specificationId=3213, Version 16.4.0, Dec. 2020, 133 pages.
3Gpp, TS 38.212 v16.4.0, "NR, Multiplexing and Channel coding." https://portal.3gpp.org/desktopmodules/Specifications/SpecificationDetails.aspx?specificationId=3214, Version 16.4.0, Dec. 2020, 152 pages.
3Gpp, TS 38.213 v16.4.0, "NR, Physical Layer Procedures for Control.", https://portal.3gpp.org/desktopmodules/Specifications/SpecificationDetails.aspx?specificationId=3215, Version 16.4.0, Dec. 2020, 181 pages.
3Gpp, TS 38.214 v16.4.0, "NR, Physical Layer Procedures for Data." https://portal.3gpp.org/desktopmodules/Specifications/SpecificationDetails.aspx?specificationId=3216, Version 16.4.0, Dec. 2020, 169 pages.
3GPP, TS 38.215 v16.4.0, "NR, Physical Layer Measurements." https://portal.3gpp.org/desktopmodules/Specifications/SpecificationDetails.aspx?specificationId=3217, Version 16.4.0, Dec. 2020, 25 pages.
3GPP, TS 38.321 v16.3.0, "NR, Medium Access Control (MAC) protocol specification." https://portal.3gpp.org/desktopmodules/Specifications/SpecificationDetails.aspx?specificationId=3194, Version 16.3.0, Dec. 2020, 156 pages.
3GPP, TS 38.331 v16.3.1, "NR, Radio Resource Control (RRC) Protocol Specification." https://portal.3gpp.org/desktopmodules/Specifications/SpecificationDetails.aspx?specificationId=3197, Version 16.3.1, Jan. 2021, 932 pages.

* cited by examiner

Worse Timing Angle (Degree)
200
150
100
50
0
-50
-100
-150
-200
rb
-25
-20
-15
-10
-5
0
5
10
15
20
25
Worse Timing Angle (Degree)
rb

SYSTEMS AND METHODS FOR TIMING MISMATCH CALIBRATION IN DISTRIBUTED MIMO USING MULTIPLE SUB-BAND MEASUREMENTS

TECHNICAL FIELD

This disclosure relates generally to calibration mechanism for distributed multiple-input and multiple-output (MIMO) operations, and in particular relates to systems and methods for user equipment assisted calibration mechanism in distributed MIMO.

BACKGROUND

For a cellular system operating in low carrier frequency in general, a sub-1 GHz frequency range (e.g. less than 1 GHz) as an example, supporting large number of channel state information reference signal (CSI-RS) antenna ports (e.g., 32) or many antenna elements at a single location or remote radio head (RRH) is challenging due to a larger antenna form factor size needed considering carrier frequency wavelength than a system operating at a higher frequency such as 2 GHz or 4 GHz. At such low frequencies, the maximum number of CSI-RS antenna ports that can be co-located at a site (or RRH) can be limited, for example to 8. This limits the spectral efficiency of such systems. In particular, the multi-user MIMO (MU-MIMO) spatial multiplexing gains offered due to large number of CSI-RS antenna ports (such as 32) cannot be achieved due to the antenna form factor limitation. One way to operate a system with large number of CSI-RS antenna ports at low carrier frequency is to distribute the physical antenna ports to different panels/RRHs, which can be possibly non-collocated. The multiple sites or panels/RRHs can still be connected to a single (common) base unit forming a single antenna system, hence the signal transmitted/received via multiple distributed RRHs can still be processed at a centralized location. With small antennas at each RRH, higher spatial multiplexing can be achieved with join processing from distributed transmission reception points (TRPs).

DESCRIPTION OF EXAMPLE EMBODIMENTS

Figure 1:
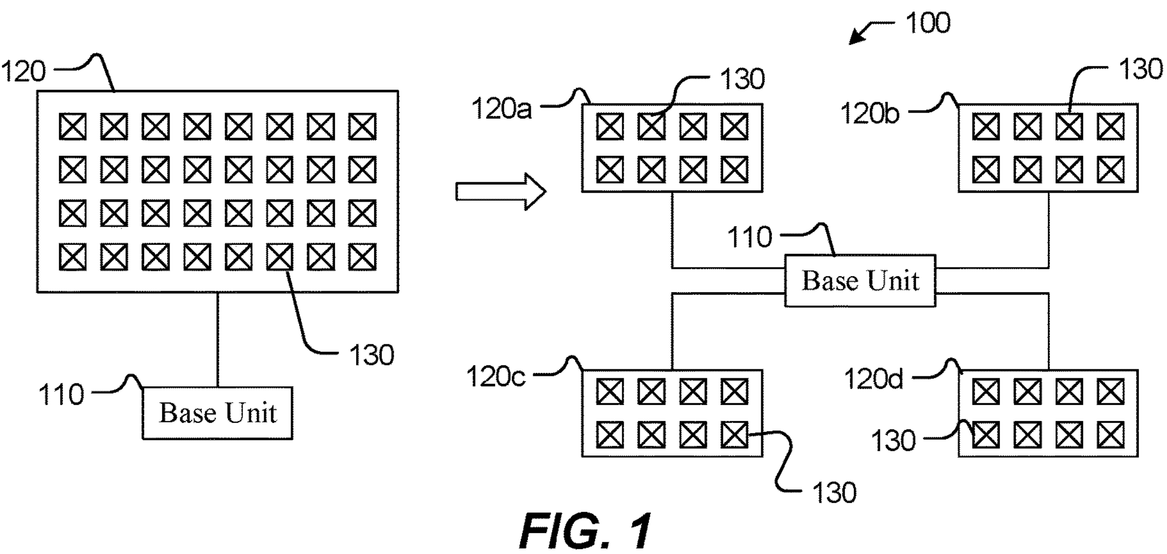
FIG. 1 illustrates an example distributed MIMO.

Timing Mismatch Calibration in Distributed MIMO Using Multiple Sub-Band Measurements In particular embodiments, a communication device may perform phase-timing calibration for the radio frequency (RF) receive/transmit antenna network of multiple remote radio heads (RRHs)/panels in a communication system to utilize downlink/uplink channel reciprocity in a wide operating bandwidth. The communication system may be referred as distributed MIMO system, multi-transmission-reception point (mTRP) system, or coherent joint transmission (CJT) system. The communication device may utilize embodiments based on single panel codebook and feedback design on multiple frequency bands to determine and estimate the accurate timing mismatch (i.e., the correct timing-phase slope) within the operation wide bandwidth based on phase offset measurements between two or more distributed MIMO transceivers using multiple precoding matrix indicator (PMI) reports at different frequency bands. Based on operating bandwidths, target timing mismatch, and target calibration error of distributed MIMO systems, the embodiments disclosed herein may guarantee the calibrated phase timing mismatch within target timing mismatch of the distributed MIMO systems. Although disclosure describes particular calibrations by particular systems in particular manners, this disclosure contemplates any suitable calibration by any suitable system in any suitable manner.

In particular embodiments, the communication device may determine an optimal number of resource block separation between pairs of measurements based on system settings of a distributed communication system associated with the communication device. The system settings may specify one or more of a maximum tolerable calibration error or a required calibration accuracy. In particular embodiments, the communication device may access a plurality of transmission signals between a plurality of respective transmission reception points and a user equipment. The plurality of transmission reception points may operate in a particular frequency band. The plurality of transmission reception points may comprise at least a first transmission reception point and a second transmission reception point. The plurality of transmission signals may comprise at least a first transmission signal between the first transmission reception point and the user equipment and a second transmission signal between the second transmission reception point and the user equipment. In particular embodiments, the communication device may access a plurality of measurements using one or more reference signals at a plurality of sub-frequency bands over the particular frequency band. The plurality of measurements may comprise at least a first pair of measurements associated with a first pair of sub-frequency bands and a second pair of measurements associated with a second pair of sub-frequency bands. In particular embodiments, the first pair of measurements may be separated by a first number of resource blocks and the second pair of measurements may be separated by a second number of resource blocks. The first pair of measurements and the second pair of measurements may be separated by the optimal number of resource block separation. In particular embodiments, the communication device may determine a timing mismatch between the first transmission signal and the second transmission signal based on the optimal number of resource block separation between pairs of measurements and the plurality of measurements associated with the plurality of sub-frequency bands. The communication device may further generate an integrated transmission signal based on the first transmission signal, the second transmission signal, and the timing mismatch.

Certain technical challenges exist for timing mismatch calibration in distributed MIMO systems. One technical challenge may include determining the number of resource block separation between different pairs of measurements to properly structure the placement of multiple measurements over the frequency band. The solution presented by the embodiments disclosed herein to address this challenge may be determining the proper values of the number of resource block separation based on system settings of distributed MIMO systems as the system settings may provide a maximum tolerable calibration error and the required accuracy for calibration. Another technical challenge may include determining a correct phase timing slope within a bandwidth. The solution presented by the embodiments disclosed herein to address this challenge may be utilizing multiple PMI reports, as these reports may help obtain multiple calibrated phase measurements at multiple different frequency bands. Another technical challenge may include mitigating the negative impact of errors on calibrations. The solution presented by the embodiments disclosed herein to address this challenge may be determining statistical correlations between the measurements as well as their corresponding frequency bands as the statistical correlations may improve the robustness to the measurement errors.

Certain embodiments disclosed herein may provide one or more technical advantages. A technical advantage of the embodiments may include improved timing calibration accuracy (e.g., less than 2 nanoseconds) in distributed MIMO systems as the communication device may determine the timing mismatch within the operation bandwidth based on phase offset measurements between two or more distributed MIMO transceivers using multiple reference signals at different frequency bands. Another technical advantage of the embodiments may include simplicity of implementation and compatibility with current hardware implementation and 3GPP standardization as the disclosed embodiments can be applied to any frequency band in FR1 and/or FR2 and/or FDD systems. Certain embodiments disclosed herein may provide none, some, or all of the above technical advantages. One or more other technical advantages may be readily apparent to one skilled in the art in view of the figures, descriptions, and claims of the present disclosure.

At lower frequency bands such as FR1 or particularly sub-1 GHz band, the number of antenna elements cannot be increased in a given form factor due to large wavelength while maintaining a critical distance (e.g., $\geq\lambda/2$) between two adjacent antenna elements. As an example and not by way of limitation, for the case of the wavelength size ($\lambda$) of the center frequency 600 MHz (which may be approximately 50 cm), it may require 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, may become very large in such lower frequency bands, and it may lead to the difficulty of deploying two-dimensional (2D) antenna arrays within the size of a conventional form factor. This may result in a limited number of physical antenna elements and, subsequently CSI-RS ports, that can be supported at a single site and limit the spectral efficiency of such systems.

One possible approach to resolve the issue may be to form multiple antenna panels (e.g., antenna modules, RRHs) with a small number of antenna ports instead of integrating all of the antenna ports in a single panel (or at a single site) and to distribute the multiple panels in multiple locations/sites (or RRHs). FIG. 1 illustrates an example distributed MIMO 100. The distributed MIMO 100 may comprise a base unit 110 and multiple panels 120 such as 120*a*, 120*b*, 120*c*, and 120*d*. Each panel 120 may comprise a small number of antenna ports 130.

Figure 2:
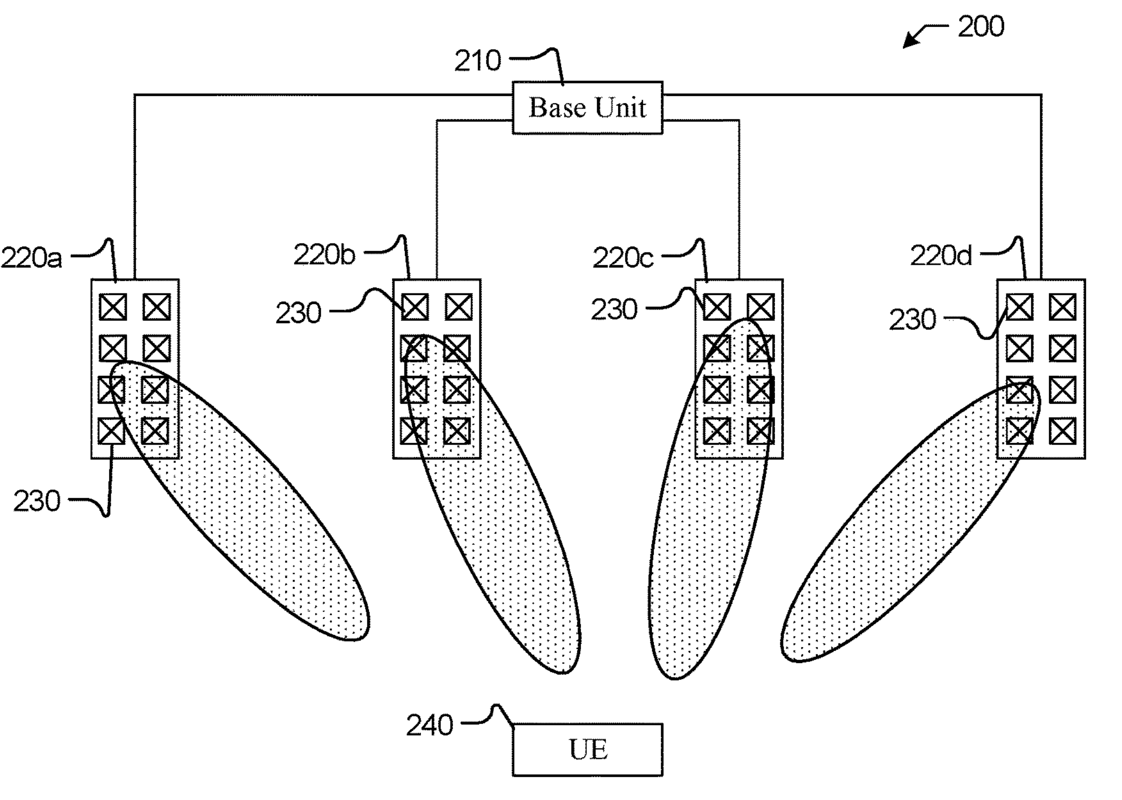
FIG. 2 illustrates another example distributed MIMO.

The multiple antenna panels at multiple locations may still be connected to a single base unit, and thus the signal transmitted/received via multiple distributed panels may be processed in a centralized manner through the single base unit. FIG. 2 illustrates another example distributed MIMO 200. The distributed MIMO 200 may comprise a base unit 210 and multiple panels 220 such as 220*a*, 220*b*, 220*c*, and 220*d*. Each panel 220 may comprise a small number of antenna ports 230. Each panel 220 may communicate with a user equipment (UE) 240. The base unit may perform operations such as base band signal processing, computations, and other operations that are necessary for the transmission and receptions of wireless signals. In another embodiment, it may be possible that multiple distributed antenna panels are connected to more than one base units, which may communicate with each other and jointly support a single antenna system.

In time division duplexing (TDD), a common approach to acquire downlink channel state information may be to use uplink channel estimation through receiving uplink reference signals (e.g., sounding reference signal) sent from user equipment. By using the channel reciprocity in TDD systems, the uplink channel estimation itself may be used to infer downlink channels. This favorable feature may enable network to reduce the training overhead significantly. However, due to the radio frequency (RF) impairment at transmitter and receiver, directly using the uplink channels for downlink channels may be not accurate and it may require a calibration process (periodically) among receive and transmit antenna ports of the RF network. In general, network may have an on-board calibration mechanism in its own RF network to calibrate its antenna panels having a plurality of receiver/transmitter antenna ports, to enable downlink/uplink channel reciprocity in channel acquisition. The on-board calibration mechanism may be performed via small-power reference signal transmission and reception from/to the RF antenna network of network and thus it may be done by network's implementation in a confined manner (i.e., that may not interfere with other entities). However, it may become difficult to perform the on-board calibration in distributed MIMO systems due to the distribution of the panels/RRHs over a wide region, and thus it may require over-the-air (OTA) signaling mechanisms to calibrate receive/transmit antenna ports among multiple RRHs/panels far away in distributed MIMO.

As discussed in the aforementioned challenges, timing calibration may be an important issue for distributed MIMO in general. Massive MIMO base stations may use an on-board coupling network and calibration circuits, which may be referred to as the on-board calibration for brevity, to measure the gain and phase differences among transceivers in the same radio frequency (RF) unit in order to maintain the reciprocity between downlink and uplink channels in the TDD system. For the on-board calibration, one RF chain corresponding to one antenna port may serve as a reference to other RF chains for other antenna ports. In the case of the distributed MIMO, such reference transceiver's signal may need to be shared between distributed RRHs/panels/modules, which may be physically far apart. Using RF cables to distribute the reference may be not preferable as it may limit the deployment scenarios. In the distributed MIMO, the use of different local oscillators between distributed antenna modules may impose even more challenges in achieving calibration as the phase of local oscillators may drift. Periodic calibration may be needed to compensate for the phase drift. However, this phase drift (or phase offset) may be changing with frequency due to timing mismatch between multiple distributed RRHs/panels/modules. Thus, conventional phase calibration algorithms to compensate a phase drift at a frequency band may be not sufficient. Phase-timing slope calibration may be important to guarantee the distributed MIMO performance according to theoretical analysis.

The embodiments disclosed herein disclose user equipment assisted calibration methods for distributed MIMO systems using the measurements obtained based on the transmissions and receptions of reference signals. As an example and not by way of limitation, the one or more reference signals may comprise one or more of a precoding-matrix-indicator (PMI) report, a channel-state-information reference signal (CSI-RS), a sounding reference signal (SRS), a demodulation reference signal (DMRS), or any suitable reference signal. The embodiments disclosed herein use precoding matrix indicator (PMI) reports as an example to illustrate the disclosed methods. However, the disclosed method may also be applied to systems where the measurements are obtained using other reference signals, such as CSI-RS, SRS, and demodulation reference signals (DMRS). More information on PMI reports may be found in U.S. Provisional Patent Application No. 63/153,653, which is incorporated by reference.

Although low-band TDD systems may be exemplified for motivation purposes, the embodiments disclosed herein can be applied to any frequency band in FR1 and/or FR2 and/or frequency division duplexing (FDD) systems. Furthermore, all the disclosed components and embodiments can be applicable for uplink transmission when the scheduling unit in time is either one subframe (which may consist of one or multiple slots) or one slot. As a result, the embodiments disclosed herein may have a technical advantage of simplicity of implementation and compatibility with current hardware implementation and 3GPP standardization as the disclosed embodiments can be applied to any frequency band in FR1 and/or FR2 and/or FDD systems.

Figure 3:
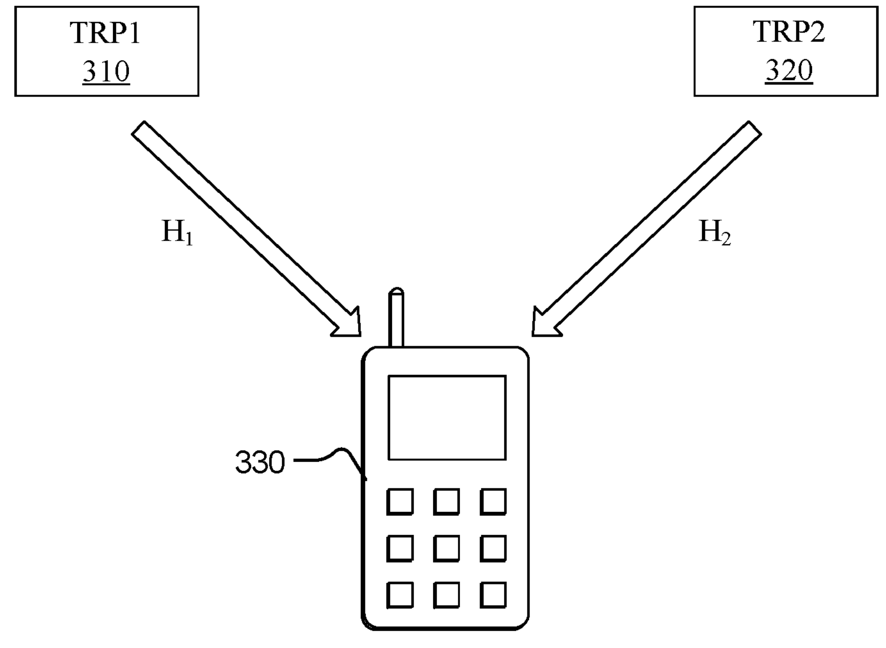
FIG. 3 illustrates an example joint transmission from two TRPs to a single user equipment.

FIG. 3 illustrates an example joint transmission from two TRPs to a single user equipment. Particular embodiments may formulate the joint transmission problem by incorporating all the possible impairments come across in a real-world operation. As illustrated in FIG. 3, there may be a single-user (SU) multi-carrier downlink data transmission from two transmission reception points (TRPs) (e.g., TRP1 310 and TRP2 320) to a user equipment 330.

For the system illustrated in FIG. 3, the received signal at the user equipment 330 may be given by:

$$y(f)=\alpha\left(H_1(f)P_1+e^{j(2\pi\Delta\tau f+\Delta\varphi_0)}H_2(f)P_2\right)x+n, \tag{1}$$

where x is the transmitted data symbols from two TRPs. $H_i(f)$, $P_i$ are channel and precoding vector, respectively of f-th sub-carrier from i-th TRP, where $i\in\{1, 2\}$, and n is AWGN noise at the user equipment 330. Moreover, in equation (1), $\Delta\varphi_0$ is the phase offset arising due to RF impairments and $\Delta\tau$ is the timing mismatch between TRP1 310 and TRP2 320. In particular, $\Delta\varphi_0$ is a common phase offset on all the sub-carriers for downlink and/or uplink transmissions, while $\Delta\tau$ generates a phase ramp across sub-carriers. Denote the resultant phase offset due to phase and timing mismatches as $\varphi(f)=2\pi\Delta\tau f+\Delta\varphi_0$.

Note that, the same phase offset may be observed for multiple sub-carriers as long as the following condition is satisfied:

$$e^{j(2\pi\Delta\tau f_1+\Delta\varphi_0)}=e^{j(2\pi\Delta\tau f_2+\Delta\varphi_0)}, \tag{2}$$

$$(2\pi\Delta\tau f_1+\Delta\varphi_0)\bmod 2\pi=(2\pi\Delta\tau f_2+\Delta\varphi_0)\bmod 2\pi,$$

for $f_1\neq f_2$.

According to equation (1), without the knowledge of phase offset $\Delta\varphi_0$ and timing mismatch $\Delta\tau$, the signals received from two TRPs may not be constructively combined at the serving user equipment 330. As the consequences, the signals received from two TRPs may not necessarily contribute to a higher signal-to-noise-plus-interference ratio (SINR) and thereby deteriorating the potential performance improvements of joint transmission. Hence, $\Delta\varphi_0$ and $\Delta\tau$ may need to be sufficiently compensated in order to fully exploit the gains of joint transmission. This may justify the requirement of a robust calibration algorithm to correct those phase/timing impairments prior to the actual data transmission. This may be a challenging task, given additional constrains such as limited information exchange between TRPs in commercial 5G networks.

Particular embodiments may compensate the relative phase difference between two TRPs in a given time and frequency. In particular embodiments, the phase offset may comprise the following components: (i) the relative timing offset and, (ii) the common phase offset between two TRPs as shown in equation (2). Timing mismatch of two TRPs may be due to the relative timing offset difference that depends on processing time offsets of electronics and processing components within each TRP processing data flow. While the common phase $\Delta\phi_0$ may not depend on frequency, the timing mismatch $\Delta\tau$ may be linearly dependent on frequency of the signals. From equation (2), the phase timing calibration algorithm may determine the correct phase timing slope in addition to the phase offset calibration algorithms.

To get correct the phase timing slope within a bandwidth, particular embodiments may leverage multiple PMI reports to obtain multiple calibrated phase measurements at multiple different frequency bands. If there are severe noise and PMI feedback errors or a large bandwidth, the number of PMI reports may be increased to get a robust phase timing calibration result. Utilizing multiple PMI reports may be an effective solution for addressing the technical challenge of determining a correct phase timing slope within a bandwidth as these reports may help obtain multiple calibrated phase measurements at multiple different frequency bands.

Figure 4:
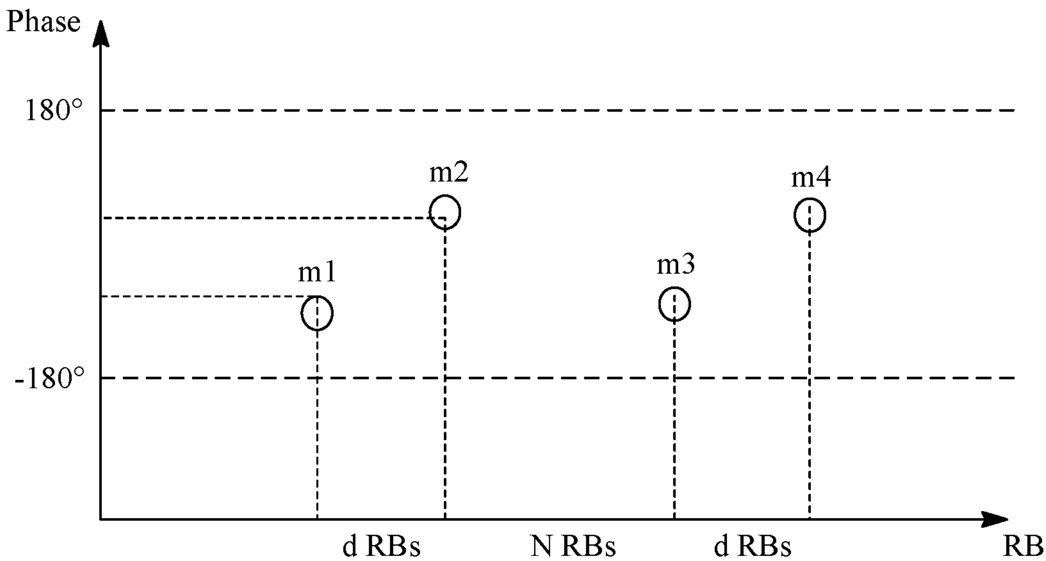
FIG. 4 illustrates an example timing calibration design with 4 sub-band measurements.

FIG. 4 illustrates an example timing calibration design with 4 sub-band measurements. Assuming using four calibrated phases at four different bands as shown in FIG. 4 as an example, the embodiments disclosed herein may be illustrated as follows. Note that, the embodiments disclosed herein can be applied to the case where more than 4 measurements are available.

As shown in FIG. 4, this disclosure denotes the 4 sub-band measurements as (m1, m2, m3, m4), respectively. The first pair of measurements (m1, m2) may comprise a first measurement (m1) at a first sub-frequency band and a second measurement (m2) at a second sub-frequency band. The first measurement and the second measurement may be separated by the first number of resource blocks being equal to the optimal number of resource block separation between measurements. The second pair of measurements (m3, m4) may comprise a third measurement (m3) at a third sub-frequency band and a fourth measurement (m4) at a fourth sub-frequency band. The third measurement and the fourth measurement may be separated by the second number of resource blocks being equal to the optimal number of resource block separation between measurements. In the embodiments disclosed herein, there are two design parameters: (1) the number of resource blocks (RBs) between measurements (m1, m2) and (m3, m4), which is denoted as d, and (2) the number of resource blocks (RBs) between measurements (m2, m3), which is denoted by N. Assume each of these 4 phase measurements has a maximum phase estimation error of $\Delta m$.

Based on measurements (m1, m2, m3, m4), the computing systems may estimate the timing mismatch $\Delta\tau$ as follows. In particular embodiments, the computing systems may firstly perform short frequency distance calibration between measurement pairs (m1, m2) and (m3, m4). For each pair of measurements (m1, m2) and (m3, m4), the computing systems may detect phase wraparound and recover the unwrapped phase measurements. The target may be to properly set the design parameter d such that phase wraparound issues in each pair of measurements can be tackled. In particular embodiments, the computing system may determine an optimal number of resource block separation between measurements based on one or more of a maximum calibration error, a target tolerated timing mismatch, a maximum timing mismatch, or a carrier spacing. The computing systems may utilize a particular technology for obtaining unwrapped phase measurements. More information on obtaining unwrapped phase measurements may be found in U.S. Provisional Patent Application No. 63/522,059, filed on Jun. 20, 2023, and U.S. Provisional Patent Application No. 63/426,996, filed on Nov. 21, 2022, each of which is incorporated by reference.

Let $$m'_1, m'_2, m'_3, m'_4$$

denote the true phase of m1, m2, m3, m4, respectively, and $\Delta m_1$, $\Delta m_2$, $\Delta m_3$, $\Delta m_4$ as their corresponding phase measurement errors. We have:

$$m_i = m'_i + \Delta m_i,\ i = 1, 2, 3, 4.$$

Without the loss of generality, this disclosure elaborates on the phase timing slope estimation error on measurement pair (m1, m2). The same analysis may be applied to (m3, m4) with minor changes on notations. The estimated timing slope $k_1$ of measurement pair (m1, m2) may be given by:

$$k_1 = \frac{m_2 - m_1}{d} = \frac{m'_2 - m'_1}{d} + \frac{\Delta m_2 - \Delta m_1}{d} = k'_1 + \frac{\Delta m_2 - \Delta m_1}{d}, \tag{3}$$

where $$k'_1$$

denotes the true slope between measurement m2 and m1.

Given the maximum phase estimation error $\Delta m$, we have:

$$k'_1 - \frac{2*\Delta m}{d} \le k_1 \le k'_1 + \frac{2*\Delta m}{d}, \tag{4}$$

where $$\frac{2*\Delta m}{d}$$

is the maximum phase timing slope error of each measurement pair. The phase timing slope in equation (4) may be determined based on the maximum calibration error $\Delta m$ and the number of RB separations between measurements (m1, m2) and (m3, m4), i.e., d. The proper value of d to tackle phase wraparound issues may depend on target maximum timing mismatch of the system hardware implementations. In the following, this disclosure describes in detail how to design phase-timing calibration for worst case scenario with the timing mismatch of $\Delta\tau_{max}$=80 ns. Denote $\tau_{min}$ as the maximum tolerated timing mismatch error that can be obtained from each pair of the measurements. For each of the two-measurement pair, the number of RB separation d may be determined based on target tolerated timing mismatch $\tau_{min}$. Assume here $\tau_{min}$=10 ns. In practical distributed MIMO systems, $\tau_{min}$ may be determined by the requirement(s) from network side and/or user equipment side. We have:

$$\frac{20}{d} \le \frac{2\pi\Delta F\tau_{min}}{\Delta F} = 2\pi\tau_{min} = 360*10*10^{-9} \tag{5}$$

$$d \ge 5.56 \text{ MHz} = 15.4\ RBs$$

$$d \ge 16\ RBs$$

Equation (5) shows that, in order to get the phase timing slope within the target timing mismatch 10 ns, two measurements separation d larger than 16 RBs may be required. From this results, smaller target tolerated timing mismatch and larger d may be required between 2 measurements in order to fulfil the target timing mismatch $\tau_{min}$.

In one embodiment, the computing systems may determine the condition of d based on the carrier spacing $\Delta F_{min}$ and the worse-case timing mismatch of the system $\Delta\tau_{max}$. With the assumption $\Delta F_{min}$=30 kHz, $\tau_{max}$=80 ns, the phase difference within one resource block may be:

$$\Delta\phi_{rb} = 2\pi*360*10^3*80*10^{-9}*\frac{180}{\pi} = 10.36o.$$

Figure 5:
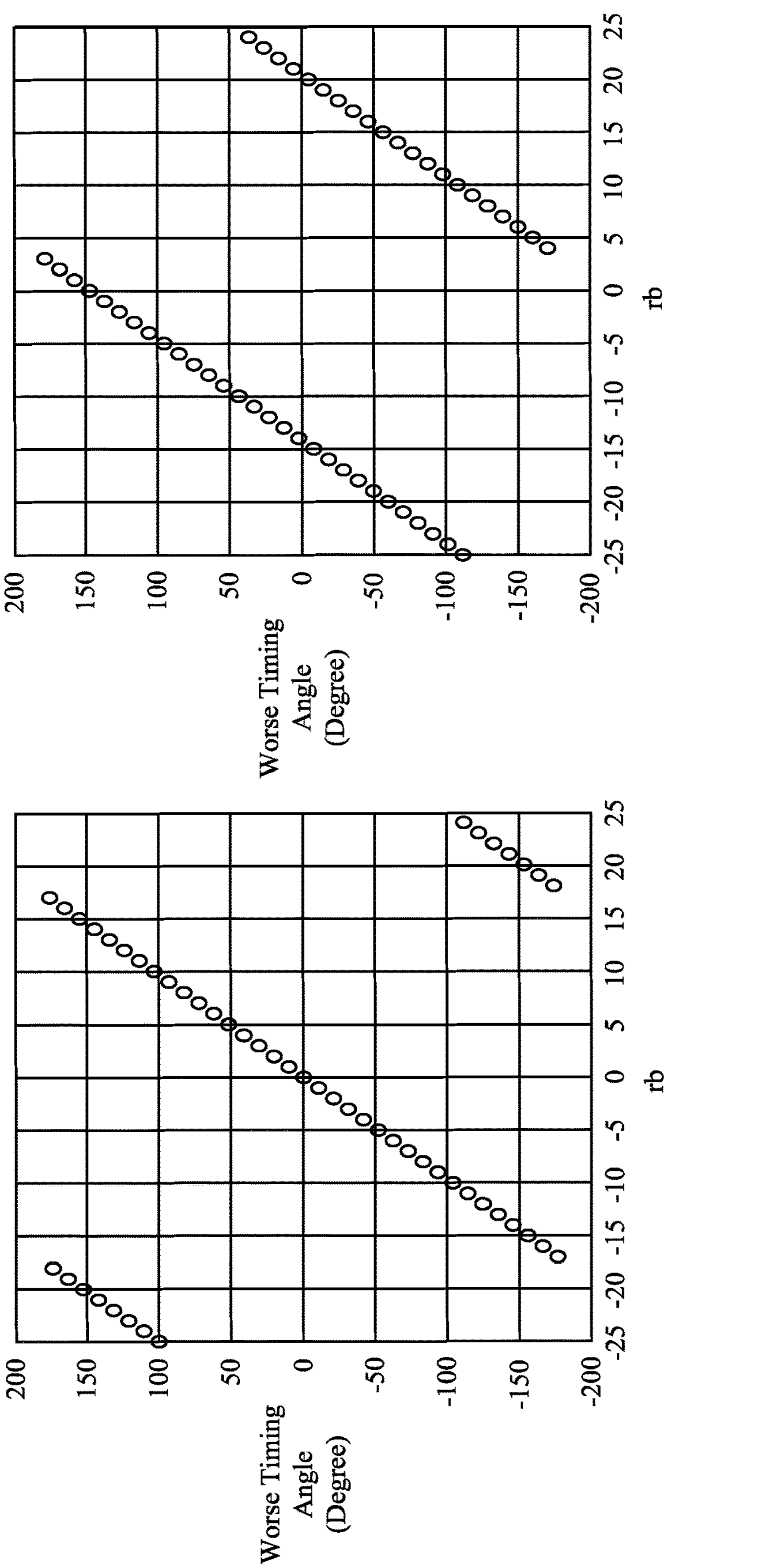
FIG. 5 illustrates example phase wraparounds.

FIG. 5 illustrates example phase wraparounds. Timing mismatch may be 80 ns with $\Delta\phi$=0, 140 degrees. With $\Delta\phi_{rb}$=10.36o, there may be phase wraparound issues in 20 MHz bandwidth (or 50 RBs) as shown in FIG. 5. FIG. 5 plots phase ramps with one-phase and two-phase wraparounds when the common phase $\Delta\phi_0$=0, 140, respectively, and timing mismatch between two TRPs is 80 ns. The number of phase wraparounds may depend on the values of $\Delta\varphi_0$ as shown in FIG. 5. Many more phase wraparounds may occur if large bandwidths, i.e., 100 MHz, are considered. These phase wraparounds may pose a challenging issue to detect a correct phase timing slope due to timing mismatch, especially in noisy channel conditions. In normal conditions, two calibrated phases in two different frequencies may be enough to detect a timing slope. More than two calibrated phases might be needed in case of large bandwidths or very noisy condition, to have a reliable timing slope. If only two calibrated phases measured on two PMI reports are supported, to avoid the phase wraparound problem, the computing systems may limit the number of RBs separation, so that a wrong timing slope, due to a phase wraparound issue, may be detected. With that constraint we have:

$$d*\Delta\phi_{rb} < 180 - \Delta m < 180 - 10 = 170 \rightarrow d \leq 16 \quad (6)$$

From equation (5) and equation (6), we obtain d=16 RBs.

In one embodiment, if because of user equipment capability the computing systems only have two calibrated phases measured on two PMI reports that satisfy the conditions (5) and (6), the computing systems may get the correct timing phase slope as follows. Continuing with the above example with the assumption $\Delta F_{min}$=30 kHz, $\Delta\tau_{max}$=80 ns, we have d=16 RBs. Thus, two phases may be located in the same phase ramp (without phase wraparound occurred between these two phases). Then the phase distance between them may be $\Delta\phi_{rb}$*d=10.36*16=165.76. If there is one wraparound phase occurred between them, then the phase distance between them may be 360−$\Delta\phi_{rb}$*d=360−10.36*16=194.24. Therefore, the computing systems may have a threshold to differentiate the above cases as $\phi_t$=180.

In another embodiment, for measurement pair (m1, m2), if the number of RBs separation between these two measurements satisfies equation (5) and equation (6), and if $|m_2-m_1 \leq \phi_t$ then the phase timing slope may be $$k_1 = \frac{m_2 - m_1}{d} \quad (7)$$

In another embodiment, for measurement pair (m1, m2), if the number of RBs separation between these two measurements satisfies equation (5) and equation (6), and if $|m_2-m_1| \geq \phi_t$, then the computing systems may unwrap the phase of m2 as $$m2 = \text{sign}(m2) * (360o - |m2|), \quad (8)$$

and obtain the phase timing slope as $$k_1 = \frac{\phi_2 - \phi_1}{d}.$$

Note that, for measurement pair (m3, m4), the computing systems may repeat the aforementioned process by replacing m1 with m3, and m2 with m4, respectively. Denote the phase timing slope after unwrapping (m3, m4) as $$k_2 = \frac{\phi_4 - \phi_3}{d}.$$

Note, that m4 may be the unwrapped value of the original measurement based on equation (8).

Estimating the timing mismatch $\Delta\tau$ based on measurements (m1, m2, m3, m4) may further comprise large frequency distance calibration based on all measurements.

In particular embodiments, determining the optimal number of resource block separation between pairs of measurements may comprise the following steps. The communication device may firstly determine a phase wraparound parameter based on the optimal number of resource block separation between measurements. The communication device may then determine a constraint for an estimation error associated with the phase wraparound parameter. The communication device may then determine an upper bound for the number of resource block separation between pairs of measurements based on the constraint for the estimation error associated with the phase wraparound parameter. The communication device may then determine a lower bound for the number of resource block separation between pairs of measurements based on a predetermined timing calibration error and the constraint for the estimation error associated with the phase wraparound parameter. The communication device may then determine one or more candidate numbers of resource block separation between the lower bound and the upper bound. The communication device may then calculate one or more timing calibration errors based on the one or more candidate numbers of resource block separation. The communication device may further select the optimal number of resource block separation from the one or more candidate numbers or resource block separation. In particular embodiments, the optimal number of resource block separation may be associated with a lowest timing calibration error among the calculated timing calibration errors.

Figure 6:
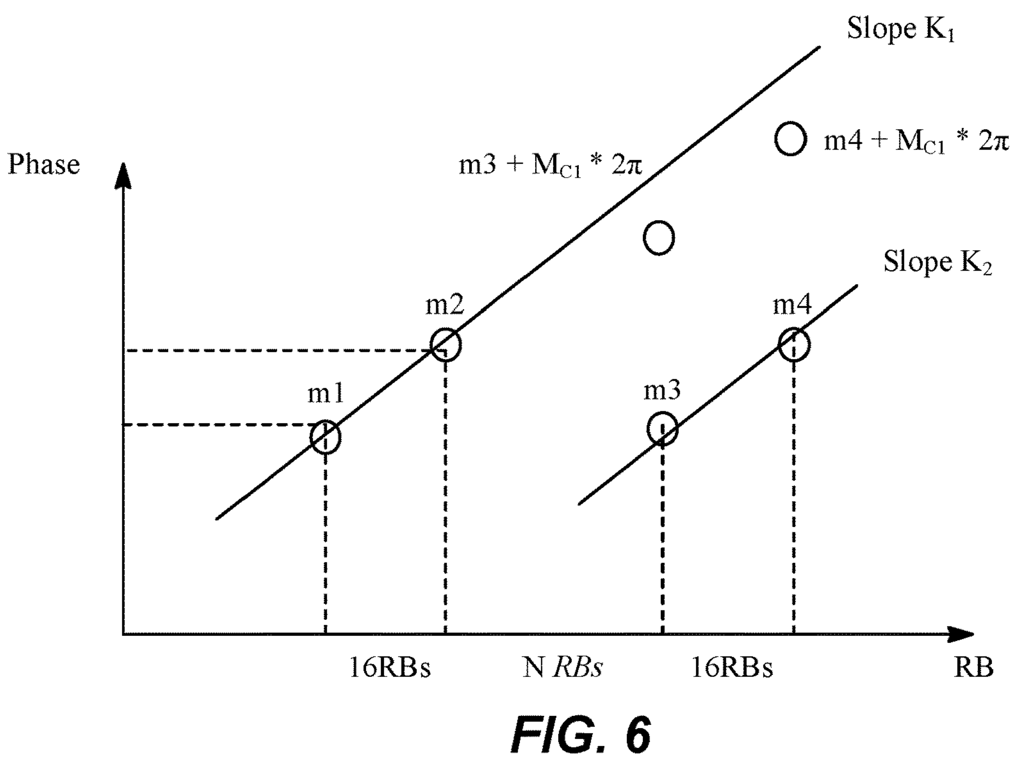
FIG. 6 illustrates an example adjustment of phase measurements such that all measurements can be fitted closely using the same linear function.

FIG. 6 illustrates an example adjustment of phase measurements such that all measurements can be fitted closely using the same linear function. As illustrated in FIG. 6, with unwrapped measurements (m1, m2) and (m3, m4), the computing system may further adjust the phase measurement (m3, m4) with respect to (m1, m2) so that all measurements can be fitted closely using a particular line (i.e., a linear function of phase with respect to the indices of RB). In order to achieve these goals and minimize the calibration error, the target may be to determine the appropriate value for the design parameter N, i.e., the number of RB separations between measurements m2 and m3, such that the line which closely fits all measurements can provide an accurate estimation on phase-timing mismatch. Determining the appropriate values of N based on various distributed MIMO system parameters, such as maximum tolerable mismatch error $\tau_{min}$ and maximum measurement errors $\Delta m$ may be as follows.

In one embodiment, the computing system may adjust the phases of m3 and m4 by $M_{C1}*2\pi$, where $M_{C1}$ is an integer. Determining the correct value of $M_{C1}$ may be important to obtain the accurate timing calibration in the embodiments disclosed herein. In particular embodiments, the computing system may determine the value of $M_{C1}$ by solving the following problem:

$$M_{C1} = \operatorname{argmin}_M \|m1 + m2 + 2(N+d)k_1 - (m3 + m4 + 2 * M * 2\pi)\|. \quad (10)$$

The solution to the problem of equation (10) may be given by $$M_{C1} = \operatorname{floor}\left(\frac{m1 + m2 + 2(N+d)k_1 - m3 - m4}{4\pi}\right), \quad (11)$$

or $$M_{C1} = \operatorname{ceil}\left(\frac{m1 + m2 + 2(N+d)k_1 - m3 - m4}{4\pi}\right). \quad (12)$$

Particular embodiments may choose between equation (11) and equation (12) depending on which one gives the smallest regression error, which may be given b $$\|m1 + m2 + 2(N+d)k_1 - (m3 + m4 + 2 * M * 2\pi)\|. \quad (13)$$

In one example, when $$\frac{m1 + m2 + 2(N+d)k_1 - m3 - m4}{4\pi} = -2.28,$$

assume $$\operatorname{ceil}\left(\frac{m1 + m2 + 2(N+d)k_1 - m3 - m4}{4\pi}\right) = -2$$

gives a regression error of 160.38 degrees, while $$\operatorname{floor}\left(\frac{m1 + m2 + 2(N+d)k_1 - m3 - m4}{4\pi}\right) = -3$$

leads to 559.61 degreed of regression error. In this case, particular embodiments may choose $M_{C1}$=–2.

Since all measurements have a maximum error of Δm, the embodiments disclosed herein analyze the impact of such error on the value of $M_{C1}$. With equation (10), the true value of $M_{C1}$ (before using flooring or ceiling operators) may be given by:

$$M_{C1}^{*} = \frac{m_1' + m_2' + 2k_1'(d+N) - m_3' - m_4'}{4\pi}.$$

The estimated $M_{C1}$ based on the actual measurements (with errors) may be given by:

$$M_{C1} = \frac{m_1' + \Delta m_1 + m_2' + \Delta m_2 + 2(k_1' + \Delta k_1)(d+N) - m_3' - \Delta m_3 - m_4' - \Delta m_4}{4\pi}.$$

Then, the estimation error on $M_{C1}$, denoted as $\Delta M_{C1}$, may be given by:

$$\Delta M_{C1} = |M_{CI}^{*} - M_{C1}| = \left|\frac{\Delta m_1 + \Delta m_2 + 2\Delta k_1(d+N) - \Delta m_3 - \Delta m_4}{4\pi}\right|. \quad (13)$$

Based on equation (13), we have the following error bound on $\Delta M_{C1}$:

$$-\frac{\left(3 + \frac{2N}{d}\right)\Delta m}{2\pi} \le \Delta M_{c1} \le \frac{\left(3 + \frac{2N}{d}\right)\Delta m}{2\pi}, \quad (14)$$

where the lower bound is derived from $$\frac{-\Delta m + \Delta m - 2\frac{2\Delta m}{d}(d+N) - \Delta m - \Delta m}{4\pi} = \frac{-2\Delta m - 2\frac{2\Delta m}{d}(d+N)}{4\pi} = \frac{-2\Delta m - 2\frac{2\Delta m}{d}(d+N)}{4\pi} = \frac{-2\Delta m - 4\Delta m - \frac{4N}{d}\Delta m}{4\pi} = \frac{-3\Delta m - \frac{2N}{d}\Delta m}{2\pi} = -\frac{\left(3 + \frac{2N}{d}\right)\Delta m}{2\pi},$$

and the upper bound is derived from $$\frac{\Delta m - \Delta m + 2\frac{2\Delta m}{d}(d+N) + \Delta m + \Delta m}{4\pi} = \frac{2\Delta m + 2\frac{2\Delta m}{d}(d+N)}{4\pi} = \frac{2\Delta m + 4\Delta m + \frac{4N}{d}\Delta m}{4\pi} = \frac{3\Delta m + \frac{2N}{d}\Delta m}{2\pi} = \frac{\left(3 + \frac{2N}{d}\right)\Delta m}{2\pi}.$$

In order to obtain mitigate the impact of phase measurement error Δm on $M_{C1}$, particular embodiments may restrict $\Delta M_{C1}$ to be small, i.e., $\Delta M_{C1}<1$. Given the maximum error Δm and the RB separation d, $\Delta M_{C1}$ may be a linear function design parameter N, i.e., the number of RB separation between m2 and m3.

Figure 7:
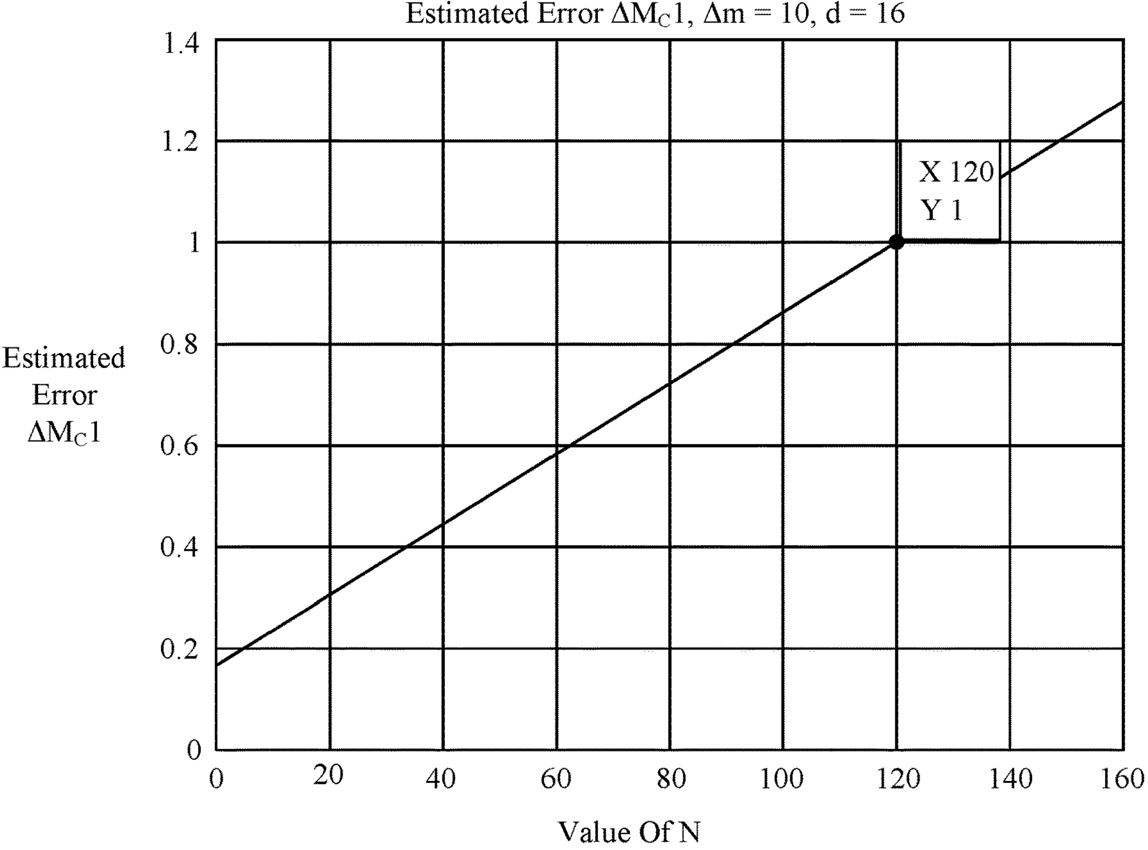
FIG. 7 illustrates an example estimated error versus the value of resource block separation.

FIG. 7 illustrates an example estimated error versus the value of resource block separation. It may be observed that $\Delta M_{C1}$ increases with N as the estimation error on $k_1$ accumulates. When N=120, we have $\Delta M_{C1}$=1. This may indicate that in order to obtain an accurate $M_{C1}$, the design parameter N should satisfy:

$$N < 120. \tag{15}$$

After determining the value of $M_{C1}$, the computing system may adjust the value of m3 and m4 as follows:

$$m3 = m3 + M_{C1} * 2\pi,\ m4 = m4 + M_{C1} * 2\pi. \tag{16}$$

Note that, due to channel noise and inaccurate PMI reports, some of the measurements may suffer from large estimation errors. Particular embodiments may identify those measurements with large errors based on the statistical relations among all the measurements. In one embodiment, a certain metric Ω may be used to measure and reflect the accuracy of each measurement. In the above example with four measurements, the following linear regression errors may be used as metric Ω for measurement m3 and m4:

$$\Omega(m3) = |m1 + (N + d)k_1 - (m3 + M_{C1} * 2\pi)|,$$

and $$\Omega(m4) = |m2 + (N + d)k_1 - (m4 + M_{C1} * 2\pi)|.$$

Based on the chosen metric Ω, some measurements may be identified as inaccurate. In one embodiment, a predefined threshold $\Omega_{th}$ may be applied such that a measurement $m_i$ is deemed noisy when $\Omega(m_i) \geq \Omega_{th}$. In another embodiment, the metric Ω may be used to separate the measurements in high-dimensional spaces, while the measurements that fall in some subspaces may identified as noisy measurements.

Upon identifying the noisy measurements, correction procedures may be invoked to obtain new and accurate measurements for those sub-bands with inaccurate measurements. In particular embodiments, the computing system may determine one or more measurements of the first and second pairs of measurements as noisy measurements based on statistical correlations between all the measurements of the first and second pairs of measurements. The computing system may then send, to the user equipment, a request for a plurality of updated measurements using the one or more reference signals at the plurality of sub-frequency bands over the particular frequency band. The computing system may further receive, from the user equipment, the plurality of updated measurements using the one or more reference signals at the plurality of sub-frequency bands over the particular frequency band. In particular embodiments, the plurality of updated measurements may comprise updated measurements for the first and second pairs of measurements.

Figure 8:
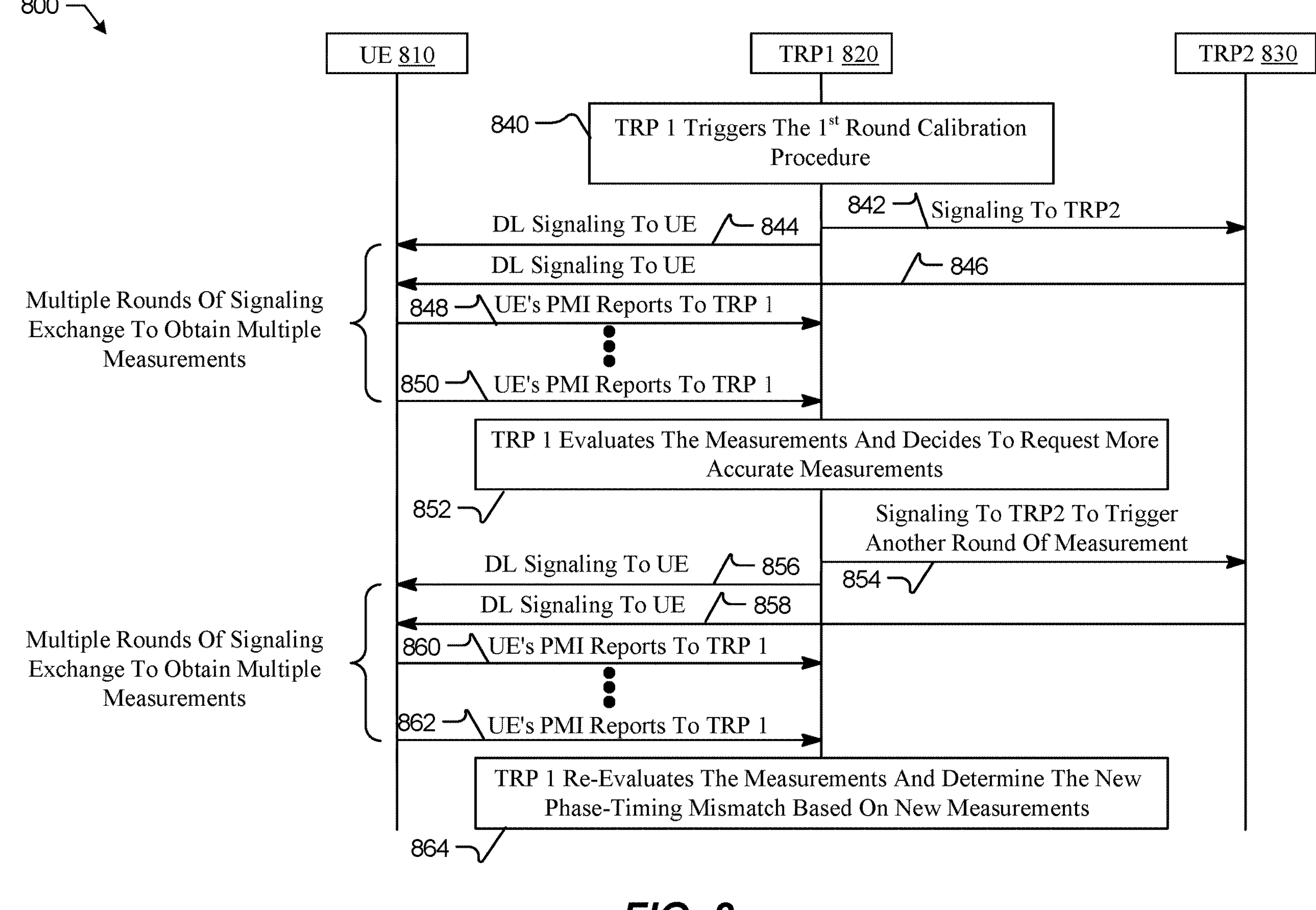
FIG. 8 illustrates an example timing diagram for the procedure for triggering additional measurements.

In one embodiment, TRPs and/or user equipment may repeat the PMI report process at those sub-bands such that TPRs can obtain more accurate measurements. FIG. 8 illustrates an example timing diagram 800 for the procedure for triggering additional measurements. Triggering additional measurements may involve user equipment (UE 810), TRP1 820, and TRP2 830. At step 840, TRP1 820 may trigger the first round of calibration procedure. At step 842, TRP1 820 may send signaling to TRP2 830. At step 844, TRP1 820 may send downlink signaling to user equipment 810. At step 846, TRP2 830 may also send downlink signaling to user equipment 810. At step 848, user equipment 810 may send its PMI reports to TRP1 820. At step 850, user equipment 810 may send its PMI reports to TRP2 830. Note that multiple rounds of signaling exchange may occur between step 844 and step 850 to obtain multiple measurements, such as the four measurements (m1, m2, m3, m4) illustrated in FIG. 4.

At step 852, TRP1 820 may evaluate the measurements and decide to request more accurate measurements. At step 854, TRP1 820 may send signaling to TRP 830 to trigger another round of measurement. At step 856, TRP1 820 may send downlink signaling to user equipment 810. At step 858, TRP2 830 may also send downlink signaling to user equipment 810. At step 860, user equipment 810 may send its PMI reports to TRP1 820. At step 862, user equipment 810 may send its PMI reports to TRP2 830. Multiple rounds of signaling exchange may occur between step 856 and step 862 to obtain multiple measurements, such as the four measurements (m1, m2, m3, m4). At step 864, TRP1 820 may re-evaluate the measurements and determine the new phase-timing mismatch based on new measurement. Determining statistical correlations between the measurements as well as their corresponding frequency bands may be an effective solution for addressing the technical challenge of mitigating the negative impact of errors on calibrations as the statistical correlations may improve the robustness to the measurement errors.

Estimating the timing mismatch Δτ may additionally comprise estimating the timing mismatch based on the unwrapped and adjusted measurements (m1, m2, m3, m4).

As discussed above, particular embodiments may obtain unwrapped and adjusted phase measurements (m1, m2, m3, m4) using statistical approaches. The statistical approaches may include various methods that can find the line which closely fit all the measurements.

In particular embodiments, the computing system may determine a phase offset between the first transmission signal and the second transmission signal based on each measurement of the plurality of measurements. Generating the integrated transmission signal may be further based on the phase offset.

Figure 9:
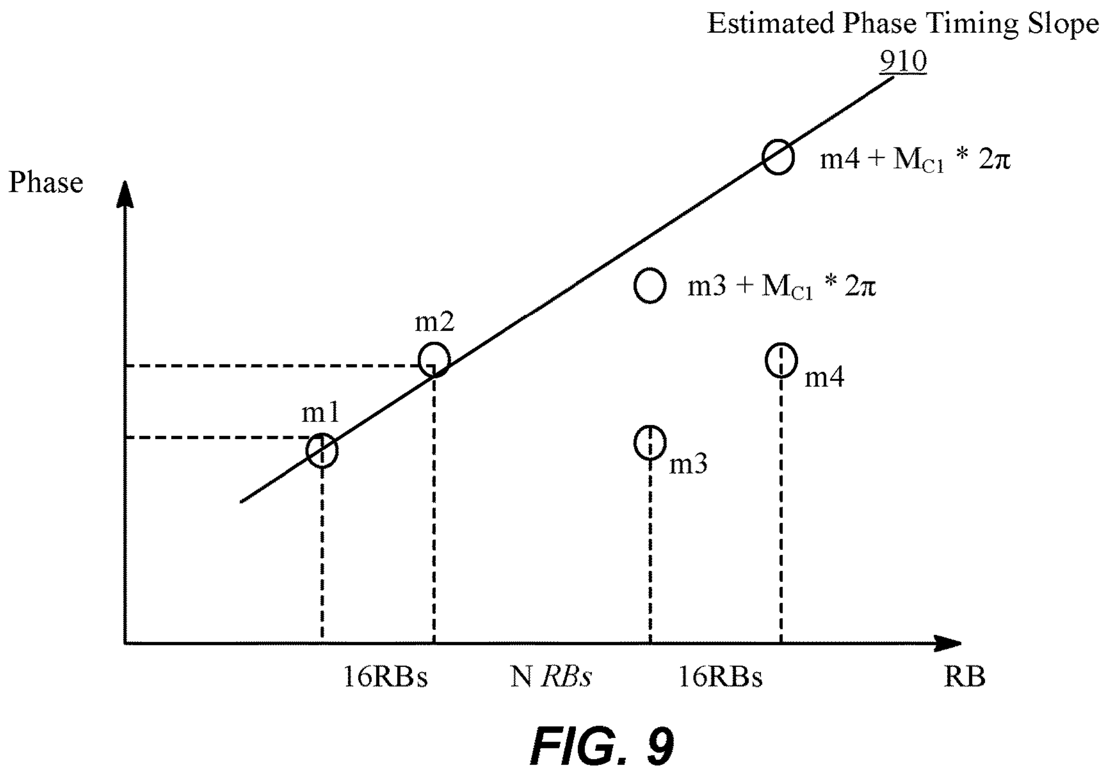
FIG. 9 illustrates an example phase timing slope estimation based on unwrapped and adjusted measurements.

In one embodiment, the phase timing slope may be estimated based on (m1, m2, m3, m4) based on the line that connects measurements (m1, m4). FIG. 9 illustrates an example phase timing slope estimation based on unwrapped and adjusted measurements. With this embodiment, the slope 910 may be determined as $$k = \frac{m_4 - m_1}{d},$$

and the timing mismatch Δτ and common phase offset $\Delta\varphi_0$ may be determined by $$\Delta\tau = \frac{k}{2 * \pi * \Delta F},\ \Delta\varphi_0 = m1 - k * m1. \tag{17}$$

In another embodiment, the computing system may use linear regression (LR) to obtain the line that fits closely with the unwrapped and adjusted measurements (m1, m2, m3, m4). Let vector $X=[x_1, x_2, x_3, x_4]$ denote the RB indices of 4 CSI-RS measurements. By incorporating two design parameters d and N, we have $$X = [x_1, x_1 + d, x_1 + d + N, x_1 + 2d + N].$$

Let vector M=[m1, m2, m3, m4] denote the vector that contains all 4 measurements. Particular embodiments may use the following steps to calculate the slope based on linear regression. First, we may extend vector X as X=[$x_1$, $x_1$+d, $x_1$+d+N, $x_1$+2d+N; 1, 1, 1, 1] such that both the slope and the intersection of the linear function can be obtained. Using linear regression, the closed-form expression of the slope and the intersection that closely fits all measurements may be given by:

$$k_{est} = (XX^T)^{-1}XM^T = \frac{4\left(\sum(m_i' + \Delta m_i)x_i\right) - \sum(m_i' + \Delta m_i)\sum x_i}{4\left(\sum x_i^2\right) - \left(\sum x_i\right)^2}, \tag{18}$$

and $$\Delta\varphi_0 = \frac{\sum x_i^2 \sum(m_i' + \Delta m_i) - \sum x_i \sum x_i(m_i' + \Delta m_i)}{4\left(\sum x_i^2\right) - \left(\sum x_i\right)^2}, \tag{19}$$

respectively. The timing mismatch may be determined by $$\Delta\tau = \frac{k_{est}}{2*\pi*\Delta F}.$$

Figure 10:
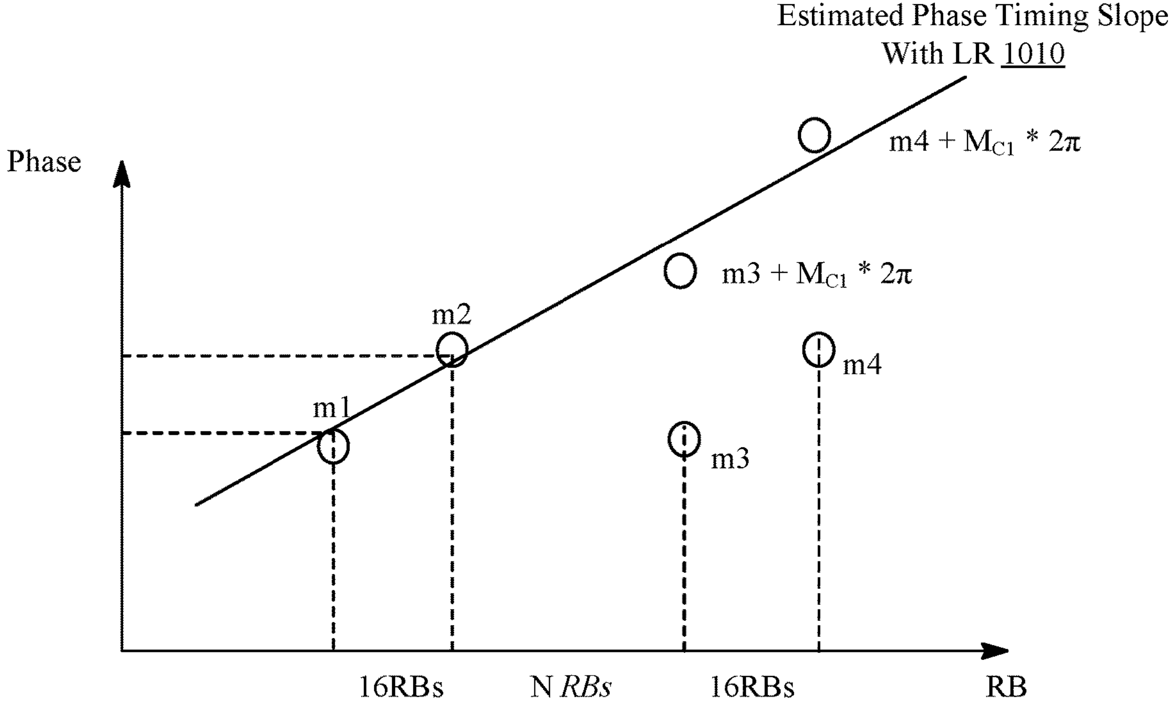
FIG. 10 illustrates another example phase timing slope estimation based on unwrapped and adjusted measurements.

FIG. 10 illustrates another example phase timing slope estimation based on unwrapped and adjusted measurements. The estimated phase timing slope 1010 may be determined based on linear regression.

In order to provide the theoretical bounds on the estimation error of the linear regression based method, the timing mismatch estimation error using linear regression may be derived as follows:

$$\Delta k_{est} = |k_{true} - k_{est}| = \left| \frac{4\left(\sum m_i' x_i\right) - \sum m_i' \sum x_i}{4\left(\sum x_i^2\right) - \left(\sum x_i\right)^2} - \frac{4\left(\sum(m_i' + \Delta m_i)x_i\right) - \sum(m_i' + \Delta m_i)\sum x_i}{4(\Sigma x_i^2) - (\Sigma x_i)^2} \right| = \left| \sum_i \left( \frac{4x_i - \sum x_i}{4\left(\sum x_i^2\right) - \left(\sum x_i\right)^2} \right) \Delta m_i \right| = \left| \sum_i w_i \Delta m_i \right|, \tag{20}$$

where $$w_i = \frac{4x_i - \sum x_i}{4\left(\sum x_i^2\right) - \left(\sum x_i\right)^2},$$

i=1, 2, 3, 4. For the worst-cast estimation error, we may have $$\Delta k_{est} = \left| \sum_i \left( \frac{4x_i - \sum x_i}{4\left(\sum x_i^2\right) - \left(\sum x_i\right)^2} \right) \Delta m_i \right| = \left| \sum_i w_i \Delta m_i \right| \le \sum |w_i||\Delta m_i|. \tag{21}$$

Figure 11:
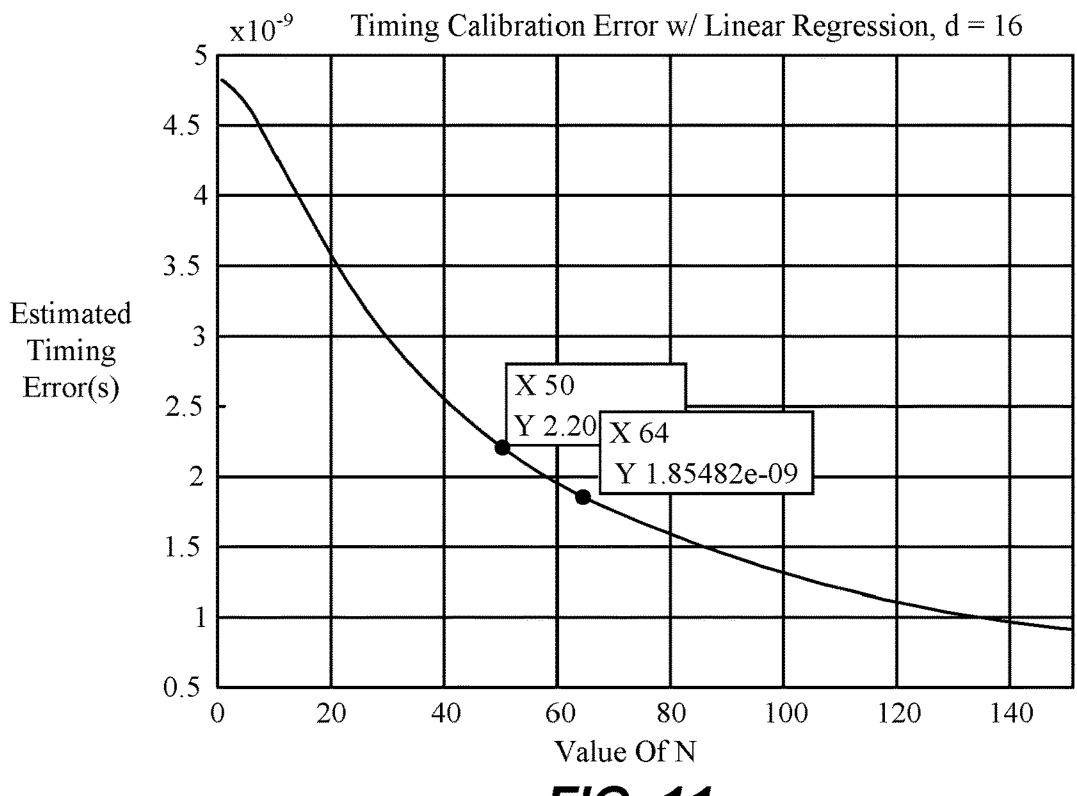
FIG. 11 illustrates an example worst-case estimation error versus the value of resource block separation.

FIG. 11 illustrates an example worst-case estimation error versus the value of resource block separation. FIG. 11 illustrates the worst-case estimation error in equation (21) versus the value of design parameter N, with d=16 RBs and Δm=10 ns. The embodiments disclosed herein assume $x_1$=49, i.e., the first measurement is located at the 49-th RB.

FIG. 11 shows that in order to achieve the target of less than 2 ns timing calibration error, the value of N may satisfy:

$$N \ge 60. \tag{22}$$

Based on equation (15) and equation (22), it may be observed that increasing the value of N leads to smaller timing calibration error Δτ, but it also results in a larger error when determining $M_{C1}$ for phase wrapping. Hence, the value of N may hold the trade-off between calibration error and phase wraparound error. In order to find an appropriate N, particular embodiments may solve the following problem:

$$N^* = \text{argmin}_N \Delta k_{est}, \text{ s.t.} |\Delta M_{C1}| < 1 - \delta,$$

where δ≥0 may be an optional safety gap to improve robustness.

Figure 12:
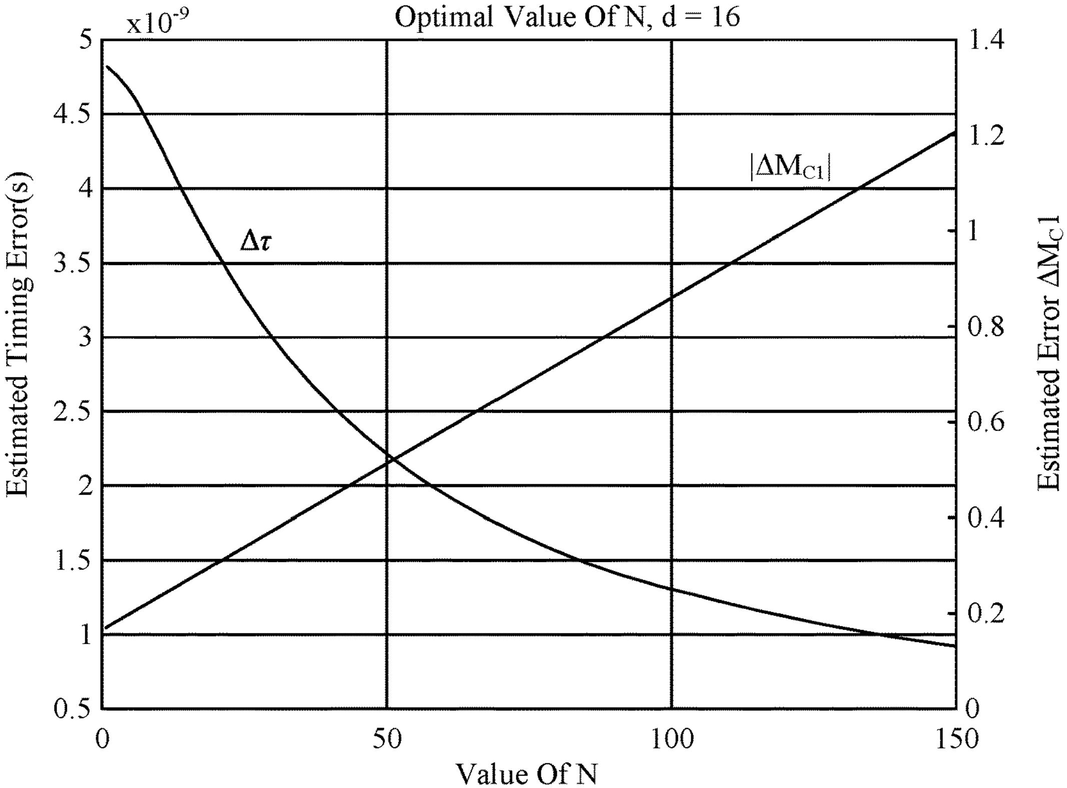
FIG. 12 illustrates an example trade-off between timing calibration error and phase wraparound error with respect to the value of resource block separation.

FIG. 12 illustrates an example trade-off between Δτ and $|\Delta M_{C1}|$ with respect to the value of N. The appropriate settings of N may be found numerically as shown in FIG. 12. It may be observed that with N∈[61, 120], $|M_{C1}|<1$ may be satisfied while Δτ<2 ns.

Thereby, particular embodiments may conclude that the value of N needs to satisfy:

$$N \in [61, 120]. \tag{23}$$

Since in practical implementations, only one PMI report may be obtained within one sub-band, which consists of 16 RBs, N should be a multiple of 16. Therefore, the candidate values of N may be given by:

$$N \in \{64, 80, 96, 112\}. \tag{24}$$

Determining the proper values of the number of resource block separation based on system settings of distributed MIMO systems may be an effective solution for addressing the technical challenge of determining the number of resource block separation between different pairs of measurements to properly structure the placement of multiple measurements over the frequency band as the system settings may provide a maximum tolerable calibration error and the required accuracy for calibration.

The embodiments disclosed herein conducted performance evaluation and validation. The evaluation and validation are based on a simulation platform, namely 3GPP NR system-level simulator (SLS). This SLS may accurately model the practical distributed MIMO systems, and therefore the results obtained from the SLS may effectively reflect the performance of the disclosed methods when deployed in practice. All the reported results are averaged over 996 user equipment drops (i.e., different channel realizations and user equipment locations) to provide comprehensive evaluations. We set d=16 RBs based on equations (3)-(6). For the design parameter N, the embodiments disclosed herein evaluate the impact of its value on the calibration accuracy and investigate the most appropriate value for it. The embodiments disclosed herein evaluate and compare the performance of the following methods:

Method 1: Estimating the timing mismatch based on the line between unwrapped and adjusted measurements (m1, m4). See equation (17) for details.

Method 2: Estimating the timing mismatch by applying linear regression to the unwrapped and adjusted measurements (m1, m2, m3, m4). See equations (18) and (19) for details.

Baseline method: State-of-the-art timing calibration method which estimates the timing mismatch based on 2 PMI reports, i.e., either measurements (m1, m2) or (m3, m4).

In Table 1, we report the average timing calibration error of the proposed method with respect to the design parameter N.

TABLE 1

Impact of the value of N on timing calibration error (d = 16)

| Value of design parameter N | Average Timing Calibration Error (996 drops) | Less than 2 ns calibration (%) |
|---|---|---|
| N = 16 | 2.04 ns | 87.55% |
| N = 64 | 1.31 ns | 99.37% |
| N = 80 | 1.01 ns | 99.50% |
| N = 96 | 1.12 ns | 99.39% |
| N = 160 | 1.47 ns | 96.26% |

The SLS results in Table 1 shows that the trend in timing calibration error with respect to the value of N matches our analysis, i.e., equations (18)-(21) and FIG. 12. It may be also observed that the best timing calibration accuracy is achieved at N=80. Overall, the disclosed methods may achieve the target <2 ns calibration accuracy with >99% of the cases, given a properly choice of N.

In Table 2, the calibration performances of the disclosed methods are compared with the state-of-the-art baseline method.

TABLE 2

Performance comparison between difference timing calibration methods (d = 16)

| Method | Average Timing Calibration Error (996 drops) | Less than 2 ns calibration (%) |
|---|---|---|
| Method 2, N = 80 | 1.01 ns | 99.50% |
| Method 1 based on the slope between (m1, m3), N = 80 | 1.80 ns | 99.10% |
| Method 1 based on the slope between (m1, m4), N = 80 | 1.88 ns | 99.10% |
| Baseline method | 4.98 ns | 36.87% |

The results in Table 2 show that, both method 1 and method 2 may obtain <2 ns accuracy with >99% with N=80. In addition, method 2 outperforms method 1 and the baseline method. For the baseline method, it may only achieve the target timing calibration accuracy in 36.87% of the cases. As illustrated by the evaluation, the embodiments disclosed herein may have a technical advantage of improved timing calibration accuracy (e.g., less than 2 nanoseconds) in distributed MIMO systems as the computing system may determine the timing mismatch within the operation bandwidth based on phase offset measurements between two or more distributed MIMO transceivers using multiple reference signals at different frequency bands.

We note that, while the timing calibration error of method 1 may be slightly higher than that of method 2, method 1 may have a lower computational complexity than method 2. This may be because the computations for linear regression, i.e., equations (18) and (19), are not required for method 1 as the slope are directly calculated based on the unwrapped and adjusted measurements. Hence, the two methods disclosed in this disclosure may offer two options to balance between higher calibration accuracy and lower computational complexity.

Figure 13:
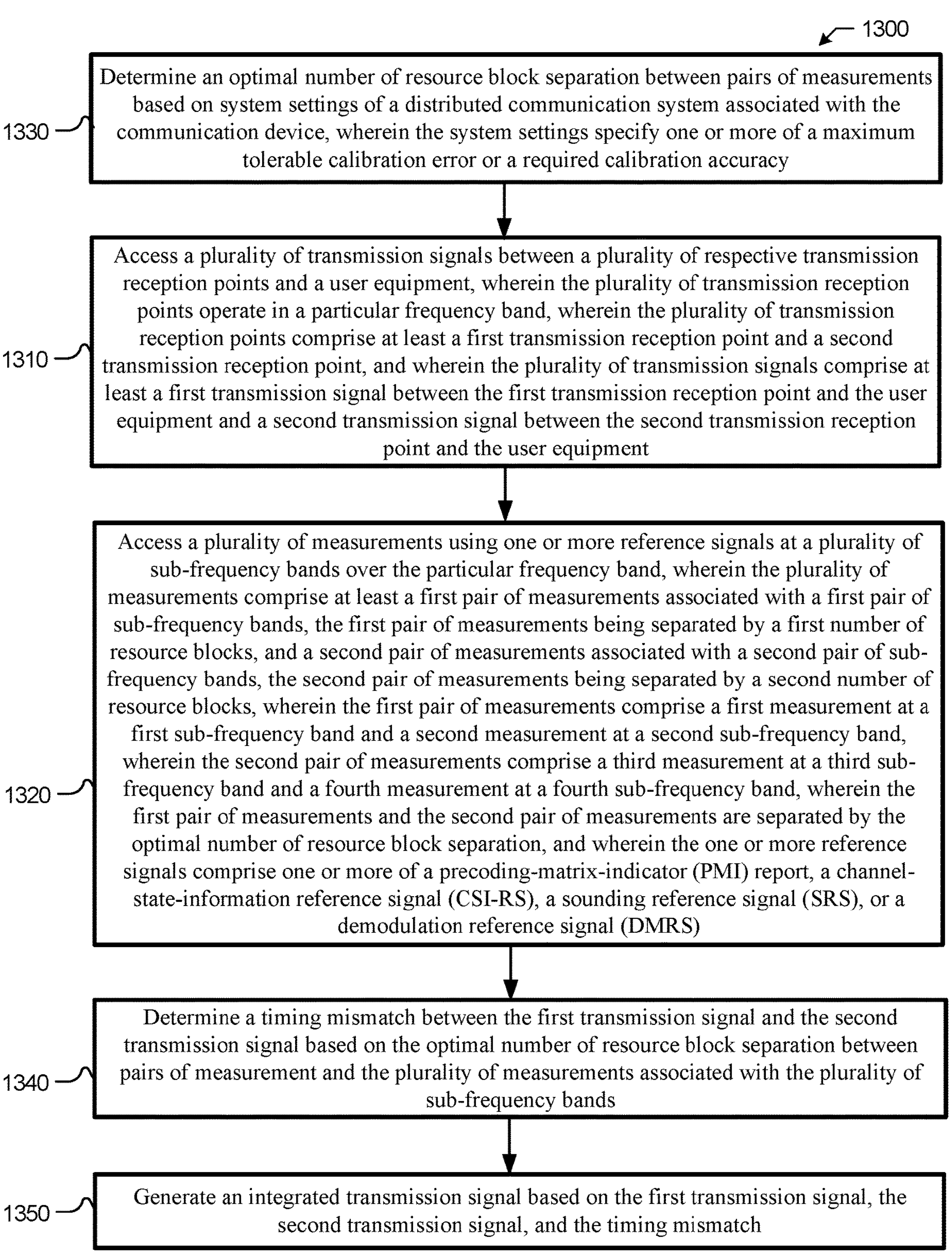
FIG. 13 illustrates an example flow diagram of a method for timing mismatch calibration, in accordance with the presently disclosed embodiments.

FIG. 13 illustrates an example flow diagram of a method 1300 for timing mismatch calibration, in accordance with the presently disclosed embodiments. The method 1300 may be performed utilizing one or more processing devices (e.g., a computing system) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 1300 may begin at step 1310 with the one or more processing devices (e.g., the computing system). For example, in particular embodiments, the computing system may determine an optimal number of resource block separation between pairs of measurements based on system settings of a distributed communication system associated with the communication device, wherein the system settings specify one or more of a maximum tolerable calibration error or a required calibration accuracy. The method 1300 may then continue at step 1320 with the one or more processing devices (e.g., the computing system). For example, in particular embodiments, the computing system may access a plurality of transmission signals between a plurality of respective transmission reception points and a user equipment, wherein the plurality of transmission reception points operate in a particular frequency band, wherein the plurality of transmission reception points comprise at least a first transmission reception point and a second transmission reception point, and wherein the plurality of transmission signals comprise at least a first transmission signal between the first transmission reception point and the user equipment and a second transmission signal between the second transmission reception point and the user equipment. The method 1300 may then continue at step 1330 with the one or more processing devices (e.g., the computing system). For example, in particular embodiments, the computing system may access a plurality of measurements using one or more reference signals at a plurality of sub-frequency bands over the particular frequency band, wherein the plurality of measurements comprise at least a first pair of measurements associated with a first pair of sub-frequency bands, the first pair of measurements being separated by a first number of resource blocks, and a second pair of measurements associated with a second pair of sub-frequency bands, the second pair of measurements being separated by a second number of resource blocks, wherein the first pair of measurements comprise a first measurement at a first sub-frequency band and a second measurement at a second sub-frequency band, wherein the second pair of measurements comprise a third measurement at a third sub-frequency band and a fourth measurement at a fourth sub-frequency band, wherein the first pair of measurements and the second pair of measurements are separated by the optimal number of resource block separation, and wherein the one or more reference signals comprise one or more of a precoding-matrix-indicator (PMI) report, a channel-state-information reference signal (CSI-RS), a sounding reference signal (SRS), or a demodulation reference signal (DMRS). The method 1300 may then continue at step 1340 with the one or more processing devices (e.g., the computing system). For example, in particular embodiments, the computing system may determine a timing mismatch between the first transmission signal and the second transmission signal based on the optimal number of resource block separation between pairs of measurements and the plurality of measurements associated with the plurality of sub-frequency bands. The method 1300 may then continue at step 1350 with the one or more processing devices (e.g., the computing system). For example, in particular embodiments, the computing system may generate an integrated transmission signal based on the first transmission signal, the second transmission signal, and the timing mismatch. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for timing mismatch calibration including the particular steps of the method of FIG. 13, this disclosure contemplates any suitable method for timing mismatch calibration including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Systems and Methods

Figure 14:
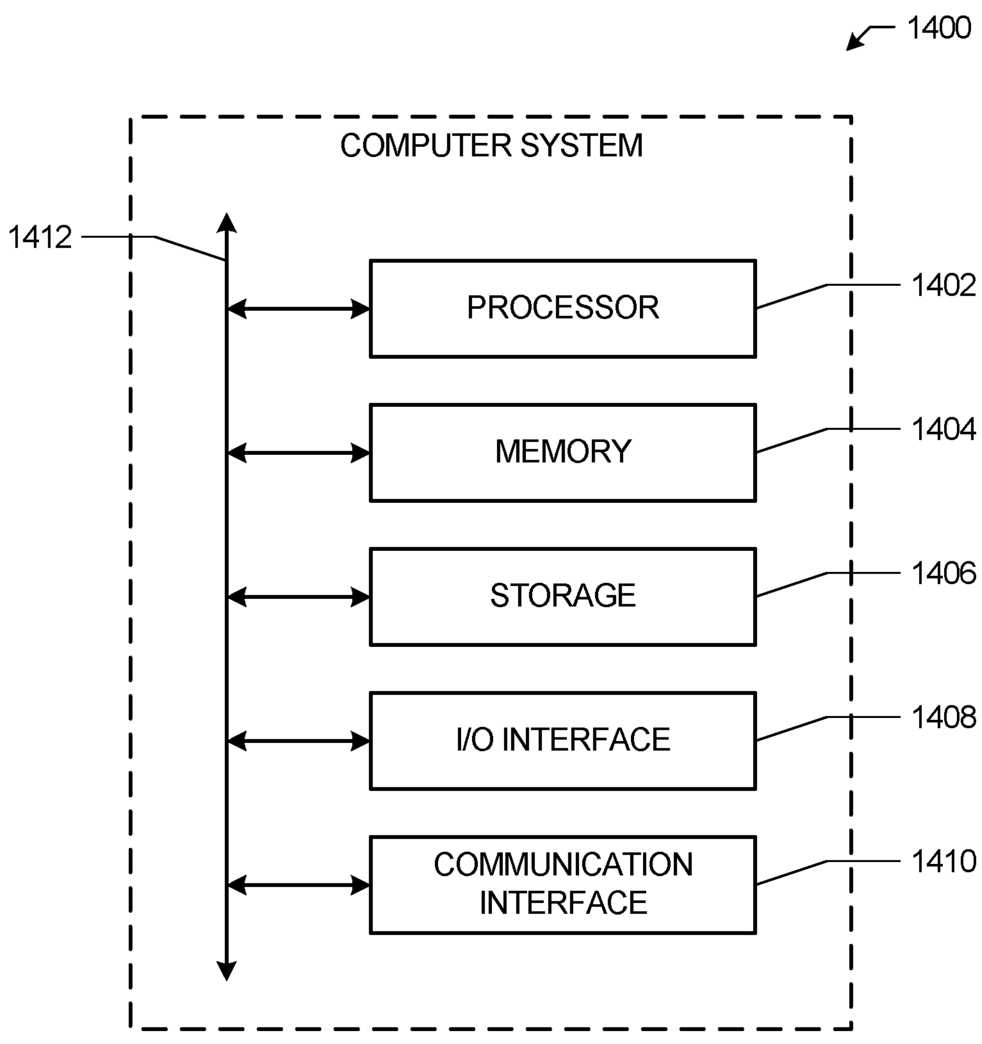
FIG. 14 illustrates an example computer system that may be utilized for timing mismatch calibration, in accordance with the presently disclosed embodiments.

FIG. 14 illustrates an example computer system 1400 that may be utilized for timing mismatch calibration, in accordance with the presently disclosed embodiments. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks.

Where appropriate, one or more computer systems 1400 may perform without substantial spatial or temporal limitation one or more steps of one or more methods described or illustrated herein. As an example, and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement. In particular embodiments, processor 1402 includes hardware for executing instructions, such as those making up a computer program. As an example, and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example, and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402.

Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example, and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere).

One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memory devices, where appropriate. Although this disclosure describes and illustrates particular memory, this disclosure contemplates any suitable memory.

In particular embodiments, storage 1406 includes mass storage for data or instructions. As an example, and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it.

As an example, and not by way of limitation, computer system 1400 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example, and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a communication device:

determining an optimal number of resource block separation between pairs of measurements based on system settings of a distributed communication system associated with the communication device, wherein the system settings specify one or more of a maximum tolerable calibration error for calibrating timing mismatches or a required calibration accuracy for calibrating timing mismatches;

accessing a plurality of transmission signals between a plurality of respective transmission reception points and a user equipment, wherein the plurality of transmission reception points operate in a particular frequency band, wherein the plurality of transmission reception points comprise at least a first transmission reception point and a second transmission reception point, and wherein the plurality of transmission signals comprise at least a first transmission signal between the first transmission reception point and the user equipment and a second transmission signal between the second transmission reception point and the user equipment;

accessing a plurality of measurements using one or more reference signals at a plurality of sub-frequency bands over the particular frequency band, wherein the plurality of measurements comprise at least a first pair of measurements associated with a first pair of sub-frequency bands, the first pair of measurements being separated by a first number of resource blocks, and a second pair of measurements associated with a second pair of sub-frequency bands, the second pair of measurements being separated by a second number of resource blocks, and wherein the first pair of measurements and the second pair of measurements are separated by the optimal number of resource block separation;

determining a timing mismatch between the first transmission signal and the second transmission signal based on (1) the optimal number of resource block separation between the pairs of measurements and (2) the plurality of measurements associated with the plurality of sub-frequency bands; and generating an integrated transmission signal based on the first transmission signal, the second transmission signal, and the timing mismatch.

2. The method of claim 1, further comprising:

determining the optimal number of resource block separation between the pairs of measurements based on one or more of a maximum calibration error, a target tolerated timing mismatch, a maximum timing mismatch, or a carrier spacing.

3. The method of claim 2, wherein determining the optimal number of resource block separation between the pairs of measurements comprises:

determining a phase wraparound parameter based on the optimal number of resource block separation between the pairs of measurements;

determining a constraint for an estimation error associated with the phase wraparound parameter;

determining an upper bound for the number of resource block separation between the pairs of measurements based on the constraint for the estimation error associated with the phase wraparound parameter;

determining a lower bound for the number of resource block separation between the pairs of measurements based on a predetermined timing calibration error and the constraint for the estimation error associated with the phase wraparound parameter;

determining one or more candidate numbers of resource block separation between the lower bound and the upper bound;

calculating one or more timing calibration errors based on the one or more candidate numbers of resource block separation; and selecting the optimal number of resource block separation from the one or more candidate numbers of resource block separation, wherein the optimal number of resource block separation is associated with a lowest timing calibration error among the calculated timing calibration errors.

4. The method of claim 2, wherein the first pair of measurements comprise a first measurement at a first sub-frequency band and a second measurement at a second sub-frequency band, wherein the first measurement and the second measurement are separated by the first number of resource blocks, the first number of resource blocks being equal to the optimal number of resource block separation between measurements, wherein the second pair of measurements comprise a third measurement at a third sub-frequency band and a fourth measurement at a fourth sub-frequency band, and wherein the third measurement and the fourth measurement are separated by the second number of resource blocks, the second number of resource blocks being equal to the optimal number of resource block separation between measurements.

5. The method of claim 1, wherein the one or more reference signals comprise one or more of a precoding-matrix-indicator (PMI) report, a channel-state-information reference signal (CSI-RS), a sounding reference signal (SRS), a demodulation reference signal (DMRS), or any suitable reference signal.

6. The method of claim 1, further comprising:
determining a phase offset between the first transmission signal and the second transmission signal based on each measurement of the plurality of measurements, wherein generating the integrated transmission signal is further based on the phase offset.

7. The method of claim 1, further comprising:
determining one or more measurements of the first and second pairs of measurements as noisy measurements based on statistical correlations between all the measurements of the first and second pairs of measurements;
sending, to the user equipment, a request for a plurality of updated measurements using the one or more reference signals at the plurality of sub-frequency bands over the particular frequency band; and
receiving, from the user equipment, the plurality of updated measurements using the one or more reference signals at the plurality of sub-frequency bands over the particular frequency band, wherein the plurality of updated measurements comprise updated measurements for the first and second pairs of measurements.

8. A communication device comprising:
one or more non-transitory computer-readable storage media including instructions; and
one or more processors coupled to the storage media, the one or more processors configured to execute the instructions to:
determine an optimal number of resource block separation between pairs of measurements based on system settings of a distributed communication system associated with the communication device, wherein the system settings specify one or more of a maximum tolerable calibration error for calibrating timing mismatches or a required calibration accuracy for calibrating timing mismatches;
access a plurality of transmission signals between a plurality of respective transmission reception points and a user equipment, wherein the plurality of transmission reception points operate in a particular frequency band, wherein the plurality of transmission reception points comprise at least a first transmission reception point and a second transmission reception point, and wherein the plurality of transmission signals comprise at least a first transmission signal between the first transmission reception point and the user equipment and a second transmission signal between the second transmission reception point and the user equipment;
access a plurality of measurements using one or more reference signals at a plurality of sub-frequency bands over the particular frequency band, wherein the plurality of measurements comprise at least a first pair of measurements associated with a first pair of sub-frequency bands, the first pair of measurements being separated by a first number of resource blocks, and a second pair of measurements associated with a second pair of sub-frequency bands, the second pair of measurements being separated by a second number of resource blocks, and wherein the first pair of measurements and the second pair of measurements are separated by the optimal number of resource block separation;
determine a timing mismatch between the first transmission signal and the second transmission signal based on (1) the optimal number of resource block separation between the pairs of measurements and (2) the plurality of measurements associated with the plurality of sub-frequency bands; and
generate an integrated transmission signal based on the first transmission signal, the second transmission signal, and the timing mismatch.

9. The electronic device of claim 8, wherein the one or more processors are further configured to execute the instructions to:
determine the optimal number of resource block separation between the pairs of measurements based on one or more of a maximum calibration error, a target tolerated timing mismatch, a maximum timing mismatch, or a carrier spacing.

10. The electronic device of claim 9, wherein determining the optimal number of resource block separation between the pairs of measurements comprises:
determining a phase wraparound parameter based on the optimal number of resource block separation between the pairs of measurements;
determining a constraint for an estimation error associated with the phase wraparound parameter;
determining an upper bound for the number of resource block separation between the pairs of measurements based on the constraint for the estimation error associated with the phase wraparound parameter;
determining a lower bound for the number of resource block separation between the pairs of measurements based on a predetermined timing calibration error and the constraint for the estimation error associated with the phase wraparound parameter;
determining one or more candidate numbers of resource block separation between the lower bound and the upper bound;
calculating one or more timing calibration errors based on the one or more candidate numbers of resource block separation; and
selecting the optimal number of resource blocks from the one or more candidate numbers of resource block separation, wherein the optimal number of resource block separation is associated with a lowest timing calibration error among the calculated timing calibration errors.

11. The electronic device of claim 9, wherein the first pair of measurements comprise a first measurement at a first sub-frequency band and a second measurement at a second sub-frequency band, wherein the first measurement and the second measurement are separated by the first number of resource blocks, the first number of resource blocks being equal to the optimal number of resource block separation between measurements, wherein the second pair of measurements comprise a third measurement at a third sub-frequency band and a fourth measurement at a fourth sub-frequency band, and wherein the third measurement and the fourth measurement are separated by the second number of resource blocks, the second number of resource blocks being equal to the optimal number of resource block separation between measurements.

12. The electronic device of claim 8, wherein the one or more reference signals comprise one or more of a precoding-matrix-indicator (PMI) report, a channel-state-information reference signal (CSI-RS), a sounding reference signal (SRS), or a demodulation reference signal (DMRS), or any suitable reference signal.

13. The electronic device of claim 8, wherein the one or more processors are further configured to execute the instructions to:

determine a phase offset between the first transmission signal and the second transmission signal based on each measurement of the plurality of measurements, wherein generating the integrated transmission signal is further based on the phase offset.

14. The electronic device of claim 8, wherein the one or more processors are further configured to execute the instructions to:

determine one or more measurements of the first and second pairs of measurements as noisy measurements based on statistical correlations between all the measurements of the first and second pairs of measurements;

send, to the user equipment, a request for a plurality of updated measurements using the one or more reference signals at the plurality of sub-frequency bands over the particular frequency band; and receive, from the user equipment, the plurality of updated measurements using the one or more reference signals at the plurality of sub-frequency bands over the particular frequency band, wherein the plurality of updated measurements comprise updated measurements for the first and second pairs of measurements.

15. A computer-readable non-transitory storage media comprising instructions executable by a processor to:

determine an optimal number of resource block separation between pairs of measurements based on system settings of a distributed communication system associated with the communication device, wherein the system settings specify one or more of a maximum tolerable calibration error for calibrating timing mismatches or a required calibration accuracy for calibrating timing mismatches;

access a plurality of transmission signals between a plurality of respective transmission reception points and a user equipment, wherein the plurality of transmission reception points operate in a particular frequency band, wherein the plurality of transmission reception points comprise at least a first transmission reception point and a second transmission reception point, and wherein the plurality of transmission signals comprise at least a first transmission signal between the first transmission reception point and the user equipment and a second transmission signal between the second transmission reception point and the user equipment;

access a plurality of measurements using one or more reference signals at a plurality of sub-frequency bands over the particular frequency band, wherein the plurality of measurements comprise at least a first pair of measurements associated with a first pair of sub-frequency bands, the first pair of measurements being separated by a first number of resource blocks, and a second pair of measurements associated with a second pair of sub-frequency bands, the second pair of measurements being separated by a second number of resource blocks, and wherein the first pair of measurements and the second pair of measurements are separated by the optimal number of resource block separation;

determine a timing mismatch between the first transmission signal and the second transmission signal based on (1) the optimal number of resource block separation between the pairs of measurements and (2) the plurality of measurements associated with the plurality of sub-frequency bands; and generate an integrated transmission signal based on the first transmission signal, the second transmission signal, and the timing mismatch.

16. The computer-readable non-transitory storage media of claim 15, further comprising instructions executable by the processor to:

determine the optimal number of resource block separation between the pairs of measurements based on one or more of a maximum calibration error, a target tolerated timing mismatch, a maximum timing mismatch, or a carrier spacing.

17. The computer-readable non-transitory storage media of claim 16, wherein determining the optimal number of resource block separation between the pairs of measurements comprises:

determining a phase wraparound parameter based on the optimal number of resource block separation between the pairs of measurements;

determining a constraint for an estimation error associated with the phase wraparound parameter;

determining an upper bound for the number of resource block separation between the pairs of measurements based on the constraint for the estimation error associated with the phase wraparound parameter;

determining a lower bound for the number of resource block separation between the pairs of measurements based on a predetermined timing calibration error and the constraint for the estimation error associated with the phase wraparound parameter;

determining one or more candidate numbers of resource block separation between the lower bound and the upper bound;

calculating one or more timing calibration errors based on the one or more candidate numbers of resource block separation; and selecting the optimal number of resource blocks from the one or more candidate numbers of resource block separation, wherein the optimal number of resource block separation is associated with a lowest timing calibration error among the calculated timing calibration errors.

18. The computer-readable non-transitory storage media of claim 15, wherein the first pair of measurements comprise a first measurement at a first sub-frequency band and a second measurement at a second sub-frequency band, wherein the first measurement and the second measurement are separated by the first number of resource blocks, the first number of resource blocks being equal to the optimal number of resource block separation between measurements, wherein the second pair of measurements comprise a third measurement at a third sub-frequency band and a fourth measurement at a fourth sub-frequency band, and wherein the third measurement and the fourth measurement are separated by the second number of resource blocks, the second number of resource blocks being equal to the optimal number of resource block separation between measurements.

19. The computer-readable non-transitory storage media of claim 15, wherein the one or more reference signals comprise one or more of a precoding-matrix-indicator (PMI) report, a channel-state-information reference signal (CSI-RS), a sounding reference signal (SRS), or a demodulation reference signal (DMRS), or any suitable reference signal.

20. The computer-readable non-transitory storage media of claim 15, further comprising instructions executable by the processor to:

determine a phase offset between the first transmission signal and the second transmission signal based on each measurement of the plurality of measurements, wherein generating the integrated transmission signal is further based on the phase offset.

* * * * *